(12) United States Patent
Taden et al.

(10) Patent No.: US 8,309,066 B2
(45) Date of Patent: Nov. 13, 2012

(54) CATIONIC BENZOXAZINE (CO)POLYMERS

(75) Inventors: Andreas Taden, Duesseldorf (DE);
Stefan Kreiling, Duesseldorf (DE);
Rainer Schoenfeld, Duesseldorf (DE);
Paula Barreleiro, Duesseldorf (DE);
Thomas Eiting, Duesseldorf (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 13/292,562

(22) Filed: Nov. 9, 2011

(65) Prior Publication Data
US 2012/0058069 A1    Mar. 8, 2012

Related U.S. Application Data

(63) Continuation of application No. PCT/EP2010/056178, filed on May 6, 2010.

(30) Foreign Application Priority Data

May 12, 2009  (DE) .......................... 10 2009 003 032

(51) Int. Cl.
*A61K 8/72*     (2006.01)
*C08G 14/10*    (2006.01)
*C08G 64/16*    (2006.01)

(52) U.S. Cl. ...................... 424/70.11; 528/163; 524/611

(58) Field of Classification Search .......................... None
See application file for complete search history.

(56) References Cited

U.S. PATENT DOCUMENTS

| | | |
|---|---|---|
| 4,607,091 A | 8/1986 | Schreiber |
| 5,021,484 A | 6/1991 | Schreiber et al. |
| 5,200,452 A | 4/1993 | Schreiber |
| 5,443,911 A | 8/1995 | Schreiber et al. |
| 5,543,516 A | 8/1996 | Ishida |
| 2007/0275285 A1* | 11/2007 | Choi et al. ..................... 429/30 |

FOREIGN PATENT DOCUMENTS

| | | |
|---|---|---|
| EP | 1760110 A1 | 3/2007 |
| JP | 2002302486 A | 10/2002 |
| WO | 0000535 A1 | 1/2000 |

OTHER PUBLICATIONS

Torregrosa, Rosario et al. "Isoprene-catalyzed lithiation of imidazole: synthesis of 2-(hydroxyalkyl)- and 2-(aminoalkyl)imidazoles." Tetrahedron, Elsevier Ltd., vol. 61, 2005, pp. 11148-11155.
Kiskan, Bans et al., "Synthesis and characterization of naphthoxazine functional poly (ε-caprolactone)." Polymer, Elsevier Ltd., vol. 46, 2005, pp. 11690-11697.
Kiskan, Baris et al., "Synthesis, Characterization, and Properties of New Thermally Curable Polyetheresters Containing Benzoxazine Moieties in the Main Chain." Journal of Polymer Science: Part A: Polymer Chemistry, vol. 46, No. 2, 2008, pp. 414-420.
Houben-Weyl, "Methoden der organischen Chemie [Methods of organic chemistry]." Georg-Thieme-Verlag, vol. E16d, 1992, pp. 755-763.
Nagai, Atsushi et al., "Synthesis and Crosslinking Behavior of a Novel Linear Polymer Bearing 1,2,3- Triazol and Benzoxazine Groups in the Main Chain by a Step-Growth Click-Coupling Reaction." Journal of Polymer Science: Part A: Polymer Chemistry, John Wiley & Sons, Inc., vol. 46, No. 7, 2008, pp. 2316-2325.
Yildirim, Ayfer et al. "Synthesis, characterization and properties of naphthoxazine-functional poly(propyleneoxide)s." European Polymer Journal, Elsevier, Ltd., vol. 42, 2006, pp. 3006-3014.
Garea, S.A. et al. "A new strategy for polybenzoxazine—montmorillonite nanocomposites synthesis." Polymer Testing, Elsevier, Ltd., vol. 28, issue 3, May 2009, pp. 338-347.

* cited by examiner

*Primary Examiner* — Brian Gulledge
(74) *Attorney, Agent, or Firm* — David LeCroy

(57) ABSTRACT

Cationic benzoxazine (co)polymers wherein at least 5% of all nitrogen atoms are in the form of quaternary nitrogen atoms, and to a method for producing said polymers. The invention also relates to a washing and cleaning agent, a textile treatment agent or a cosmetic agent containing at least one cationic benzoxazine (co)polymer according to the invention.

15 Claims, No Drawings

CATIONIC BENZOXAZINE (CO)POLYMERS

CROSS REFERENCE TO RELATED APPLICATIONS

This application is a continuation of International Patent Application No. PCT/EP2010/056178 filed 6 May 2010, which claims priority to German Patent Application No. 10 2009 003 032.8 filed 12 May 2009, both of which are incorporated herein by reference.

The present invention relates to cationic benzoxazine (co)polymers wherein at least 5% of all the nitrogen atoms are present in the form of permanently quaternary nitrogen atoms, and to a method for producing such polymers.

The invention furthermore relates to a washing and cleaning agent or textile treatment agent or to a cosmetic agent having at least one cationic benzoxazine (co)polymer of the present invention.

Benzoxazine (co)polymers are known from the prior art. They generally have an elevated glass transition temperature and are distinguished by their good electrical characteristics and their positive fire safety performance. Due to inadequate solubility in aqueous media, known benzoxazine (co)polymers cannot generally be applied in the form of aqueous solutions, emulsions or dispersions.

However, for many fields of application it is important for benzoxazine (co)polymers to be applicable in the form of aqueous dosage form, since, for example, for cosmetic applications, it is not acceptable to use harmful organic solvents.

From an environmental standpoint, it is also of great advantage to develop benzoxazine (co)polymers having elevated water solubility, since in doing so it is possible to minimize the use of volatile organic compounds (VOCs) in applications of the stated polymers.

The present invention therefore provides benzoxazine (co)polymers having elevated solubility and/or good dispersibility in aqueous solutions and which may therefore be applied without using harmful organic solvents.

It has now been found that cationic benzoxazine (co)polymers wherein at least 5% of all the nitrogen atoms are present in the form of permanently quaternary nitrogen atoms exhibit good solubility or dispersibility in aqueous media. As a consequence, they may be applied without using environmentally questionable organic solvents.

The present invention accordingly firstly provides a cationic benzoxazine (co)polymer in which at least 5% of all the nitrogen atoms, based on total number of all the nitrogen atoms in the cationic benzoxazine (co)polymer, are present in the form of permanently quaternary nitrogen atoms.

The present invention also provides a method for producing the cationic benzoxazine (co)polymer according to the invention comprising the steps:
a) providing at least one polymerizable benzoxazine compound;
b) producing a non-cationic benzoxazine (co)polymer by polymerizing at least one polymerizable benzoxazine compound under suitable polymerization conditions, a non-cationic benzoxazine (co)polymer being defined such that less than 1% of its nitrogen atoms, relative to the total number of all the nitrogen atoms in the non-cationic benzoxazine (co)polymer, are present in the form of permanently quaternary nitrogen atoms, and
c) reacting the non-cationic benzoxazine (co)polymer obtained in step b) with at least one alkylating agent, the quantity of the at least one alkylating agent being chosen so that at least 5% of all the nitrogen atoms, relative to the total number of all the nitrogen atoms in the non-cationic benzoxazine (co)polymer, are converted into permanently quaternary nitrogen atoms.

Cationic benzoxazine (co)polymers of the present invention generally have good solubility in aqueous media, allowing the stated polymers to be used in water-based formulations which are substantially free of organic solvents. Moreover, cationic benzoxazine (co)polymers according to the invention have a good capacity to interact with an entire range of different surfaces, allowing the stated polymers to be used for coating or modifying surfaces.

Cationic benzoxazine (co)polymers according to the invention are particularly suitable as a component of textile or surface treatment agents for improving soil detachment from and/or reducing susceptibility to soil redeposition onto textiles or hard surfaces.

The present invention accordingly also provides washing and cleaning agents and textile treatment agents having at least one cationic benzoxazine (co)polymer according to the invention, and the use of such polymers for improving soil detachment from and/or reducing susceptibility to soil redeposition onto textiles or hard surfaces.

Cationic benzoxazine (co)polymers according to the invention may likewise be used as a component of cosmetic agents.

The present invention accordingly also provides a cosmetic agent having at least one cationic benzoxazine (co)polymer according to the invention and the use of such polymers for hair conditioning and/or for hair shaping.

The present invention additionally provides a method for treating at least one surface, comprising the steps:
a) providing at least one cationic benzoxazine (co)polymer according to the invention in an applicable dosage form, and
b) treating at least one surface with the cationic benzoxazine (co)polymer provided in step a).

The present invention furthermore relates to the use of the cationic benzoxazine (co)polymers for coating surfaces, particularly for the antibacterial coating of surfaces and the use of such polymers as a sizing agent, for example, as a sizing agent for carbon fibers.

Cationic benzoxazine (co)polymers of the present invention are distinguished in that at least 5% of all the nitrogen atoms, relative to the total number of all the nitrogen atoms in the cationic benzoxazine (co)polymer, are present in the form of permanently quaternary nitrogen atoms.

For the purposes of the present invention, a benzoxazine (co)polymer refers to both a benzoxazine homopolymer and a benzoxazine copolymer. Benzoxazine homopolymers contain only one polymerizable benzoxazine compound in polymerized form, while benzoxazine copolymers contain at least two different polymerizable benzoxazine compounds in polymerized form.

For the purposes of the present invention, a "cationic benzoxazine (co)polymer" refers to the above-stated benzoxazine (co)polymer, the respective polymer chain having a resultant cationic overall charge, which in particular is formed by at least 5% of all the nitrogen atoms, relative to the total number of all the nitrogen atoms in the cationic benzoxazine (co)polymer, being present in the form of permanently quaternary nitrogen atoms.

For the purposes of the present invention, a "permanently quaternary nitrogen atom" refers to a nitrogen atom which is a component of the cationic benzoxazine (co)polymer and which exhibits a pH-independent positive formal charge.

For the purposes of the present invention, a "permanently quaternary nitrogen atom" in particular refers to a nitrogen atom which is a component of the cationic benzoxazine (co)polymer and which, by being covalently linked with four further carbon atoms, exhibits a positive formal charge.

For the purposes of the present invention, a nitrogen atom having a positive formal charge due to protonation should expressly not be regarded as a permanently quaternary nitrogen atom.

The positive formal charge of cationic benzoxazine (co)polymers according to the invention is balanced by a corresponding number of anions, such that a neutral overall charge is obtained. Particularly preferred anions are physiologically acceptable organic or inorganic anions. Physiologically acceptable anions which may, for example, be considered are halide ions, sulfate ions, phosphate ions, methosulfate ions and organic ions such as lactate, citrate, tartrate and acetate ions. Halide ions, in particular chloride, are preferred.

The proportion of permanently quaternary nitrogen atoms in the cationic benzoxazine (co)polymer according to the invention may be determined with sufficiently high resolution by suitable spectroscopic methods. For example, the proportion of permanently quaternary nitrogen atoms may be ascertained with the assistance of 15N-NMR spectroscopic methods. It is likewise possible to ascertain the proportion of permanently quaternary nitrogen atoms in the cationic benzoxazine (co)polymer according to the invention with the assistance of 13C and/or 1H-NMR spectroscopic methods.

Important polymer properties such as solubility in aqueous media or capacity to interact with various surfaces may be purposefully modified and tailored to a particular intended application by the proportion of permanently quaternary nitrogen atoms in the cationic benzoxazine (co)polymer.

For specific intended applications, it is therefore advantageous if, relative to the total number of all the nitrogen atoms in the cationic benzoxazine (co)polymer, at least 5%, or at least 10%, or at least 15%, or at least 20%, or at least 25%, or at least 30%, or at least 35%, or at least 40%, or at least 45%, or at least 50%, or at least 55%, or at least 60%, or at least 65%, or at least 70%, or at least 75%, or at least 80%, or at least 85%, or at least 90%, or at least 95% of all the nitrogen atoms in the particular cationic benzoxazine (co)polymer are present in the form of permanently quaternary nitrogen atoms.

In one embodiment of the present invention, 5 to 99%, preferably 10 to 80% and in particular 20 to 60% of all the nitrogen atoms of the cationic benzoxazine (co)polymer according to the invention are present in the form of permanently quaternary nitrogen atoms, relative to the total number of all the nitrogen atoms in the cationic benzoxazine (co)polymer.

Benzoxazine (co)polymers which comprise a proportion of less than 5% of permanently quaternary nitrogen atoms, relative to the total number of all the nitrogen atoms in the benzoxazine (co)polymer, generally have only inadequate solubility or dispersibility in aqueous media. Furthermore, the capacity of the polymers to interact with a plurality of surfaces is often inadequate.

In one particular embodiment of the present invention, the cationic benzoxazine (co)polymer is produced by a method comprising the following steps:
a) providing at least one polymerizable benzoxazine compound;
b) producing a non-cationic benzoxazine (co)polymer by polymerizing at least one polymerizable benzoxazine compound under suitable polymerization conditions; and
c) reacting the non-cationic benzoxazine (co)polymer obtained in step b) with at least one alkylating agent, the amount of the at least one alkylating agent chosen so that at least 5% of all the nitrogen atoms, relative to the total number of nitrogen atoms in the non-cationic benzoxazine (co)polymer, are converted into permanently quaternary nitrogen atoms.

For the purposes of the present invention, a non-cationic benzoxazine (co)polymer refers to a polymer wherein less than 1%, preferably less than 0.5%, more preferably less than 0.1% and very particularly preferably less than 0.01% of all the nitrogen atoms, relative to the total number of nitrogen atoms in the non-cationic benzoxazine (co)polymer, are present in the form permanently quaternary nitrogen atoms.

Preferred benzoxazine compounds are monomers having at least one benzoxazine group. Preferred monomers may preferably comprise up to four benzoxazine groups, wherein both individual monomers and mixtures of two or more monomers can be used.

In one particular embodiment, the at least one polymerizable benzoxazine compound is chosen from compounds of general formula (I) and/or from compounds of general formula (II),

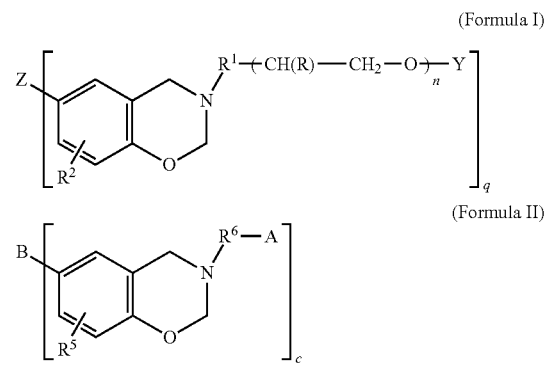

wherein q is an integer from 1 to 4; n is a number from 2 to 20,000, preferably from 3 to 10,000, more preferably from 4 to 8000, and particularly from 5 to 7000; R is mutually independently chosen from hydrogen or linear or branched, optionally substituted alkyl groups comprising 1 to 8 carbon atoms; Z is chosen from hydrogen (where q=1), alkyl (where q=1), alkylene (where q=2 to 4), carbonyl (where q=2), oxygen (where q=2), sulfur (where q=2), sulfoxide (where q=2), sulfone (where q=2) and a direct, covalent bond (where q=2); $R^1$ is a covalent bond or a divalent linking group having 1 to 100 carbon atoms; $R^2$ is chosen from hydrogen, halogen, alkyl and alkenyl or $R^2$ is a divalent residue which makes a corresponding naphthoxazine structure from the benzoxazine structure; Y is chosen from linear or branched, optionally substituted alkyl groups comprising 1 to 15 carbon atoms, cycloaliphatic residues which optionally contain one or more heteroatoms, aryl residues which optionally contain one or more heteroatoms and *—(C=O)$R^3$, wherein $R^3$ is chosen from linear or branched, optionally substituted alkyl groups with 1 to 15 carbon atoms and X—$R^4$, wherein X is chosen from S, O, and NH and $R^4$ is chosen from linear or branched, optionally substituted alkyl groups with 1 to 15 carbon atoms; c is an integer from 1 to 4; B is chosen from hydrogen (where c=1), alkyl (where c=1), alkylene (where c=2 to 4), carbonyl (where c=2), oxygen (where c=2), sulfur (where c=2), sulfoxide (where c=2), sulfone (where c=2) and a direct, covalent bond (where c=2), A is a hydroxyl group or a nitrogenous heterocycle, $R^5$ is chosen from hydrogen, halogen, alkyl and alkenyl or $R^5$ is a divalent residue which makes a corresponding naphthoxazine structure from the benzoxazine structure; and $R^6$ is a covalent bond or a divalent linking group having 1 to 100 carbon atoms.

In one embodiment, R in formula (I) in each repeat unit is mutually independently chosen from hydrogen and methyl.

The divalent organic linking groups $R^1$ in formula (I) and/or $R^6$ in formula (II) preferably comprise 2 to 50, more preferably 2 to 25 and particularly 2 to 20 carbon atoms. The divalent organic linking groups $R^1$ and $R^6$ can also be chosen from linear or branched, optionally substituted alkylene groups having 1 to 15 carbon atoms, wherein the alkylene groups are optionally interrupted by at least one heteroatom chosen from oxygen, sulfur or nitrogen.

For the purposes of the present invention, the word "interrupted" means that, in a divalent alkylene group, at least one non-terminal carbon atom of the group is replaced by a heteroatom, the heteroatom preferably chosen from *—S—* (sulfur), *—O—* (oxygen), and *—$NR^a$—* (nitrogen), $R^a$ in particular being hydrogen or a linear or branched, optionally substituted alkyl group with 1 to 15 carbon atoms.

The divalent organic linking groups $R^1$ and/or $R^6$ are preferably chosen from alkylene groups having 2 to 8 C atoms. In a preferred embodiment, $R^1$ and/or $R^6$ is/are chosen from linear alkylene groups having 2 to 6, particularly 2 or 3 carbon atoms, such as ethylene, propylene, butylene, pentylene and hexylene groups. Alternatively, $R^1$ in formula (I) and/or $R^6$ in formula (II) can be a covalent bond.

The divalent organic linking groups $R^1$ and/or $R^6$ can also have at least one arylene group and/or at least one biphenylene group which preferably contain 6 to 12 carbon atoms. The arylene and biphenylene groups may be present in substituted or unsubstituted form, with suitable substituents including alkyl, alkenyl, halogen, amine, thiol, carboxyl and hydroxyl groups. At least one carbon atom of the aromatic ring system of the groups can be replaced by a heteroatom, the heteroatom preferably chosen from oxygen, nitrogen and sulfur.

$R^2$ and $R^5$ in formula (I) and formula (II) are preferably in each case hydrogen and methyl.

A in formula (II) is a hydroxyl group or a nitrogenous heterocycle. For the purposes of the present invention, the term "nitrogenous heterocycle" refers to such ring systems having 3 to 8 ring atoms, preferably 5 to 6 ring atoms, the ring system comprising at least one nitrogen atom and at least two carbon atoms. The nitrogenous heterocycle may comprise a saturated, unsaturated or aromatic structure and, in addition to the above-stated atoms, also comprise further heteroatoms such as sulfur and/or oxygen atoms.

According to formula (II), the nitrogenous heterocycle is attached via the divalent linking group $R^6$ to the nitrogen atom of the oxazine ring of the benzoxazine structure. The divalent linking group $R^6$ may be linked with each nitrogen or carbon ring atom of the nitrogenous heterocycle wherein $R^6$ formally replaces a hydrogen atom covalently linked with a nitrogen or carbon ring atom.

Particularly preferred nitrogenous heterocycles include 5-membered nitrogenous heterocycles such as imidazoles, imidazolidones, tetrazoles, oxazoles, pyrroles, pyrrolidines and pyrazoles, or 6-membered nitrogenous heterocycles such as piperidines, piperidones, piperazines, pyridines, diazines and morpholines.

In one preferred embodiment of the present invention, the polymerizable benzoxazine compounds of general formula (I) are chosen from compounds of general formula (III)—

(Formula III)

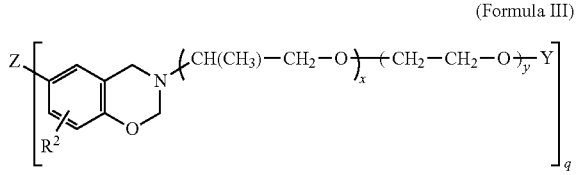

wherein x is a number from 0 to 1000 and y a number from 0 to 1000, with the proviso that x+y≧2, wherein Z, $R^2$, Y and q are defined as above.

x+y is preferably ≧3, more preferably ≧4 and very preferably ≧5.

Depending on the application profile, it is convenient to adjust the number of alkylene oxide units of the alkylene oxide chain in the polymerizable benzoxazine compound of general formulae (I) and (III). In specific embodiments, n and/or x+y therefore assume(s) a value of at least 3, 4, 6, 10, 12, 14, 16, 18, 20, 25, 30, 35, 40, 50, 60, 80, 100, 150 or 200 as the lower limit. A convenient upper limit for n and/or x+y in benzoxazine compounds according to the invention of general formula (I) or (III) is preferably a value of at most 10,000, 2000, 1800, 1600, 1400, 1200, 1000, 800, 600 or 400.

In a further preferred embodiment of the present invention, benzoxazine compounds of general formula (II) are chosen from compounds of general formula (IV) and/or from compounds of general formula (V)—

Formula (IV)

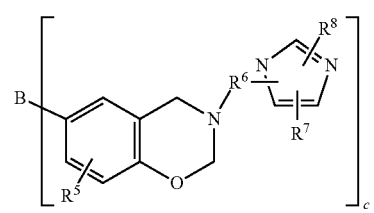

Formula (V)

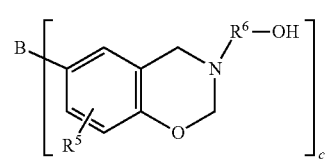

wherein $R^7$ and $R^8$ are mutually independently chosen from hydrogen, halogen, linear or branched, optionally substituted alkyl groups, alkenyl groups and aryl groups; wherein c, B, $R^5$ and $R^6$ are defined as above.

In a further embodiment, $R^7$ and $R^8$ in formula (IV) are mutually independently chosen from hydrogen, methyl, ethyl, n-propyl, iso-propyl, n-butyl, sec-butyl and iso-butyl; wherein $R^7$ and $R^8$ in particular are hydrogen or methyl.

Particularly preferred benzoxazine compounds of general formula (IV) are chosen from the following benzoxazine compounds:

(B-II)

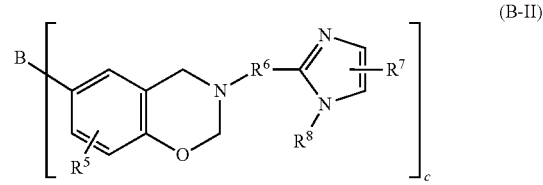

wherein c, B, $R^5$, $R^6$, $R^7$ and $R^8$ are defined as above.

Specific benzoxazine compounds of general formula (IV) can be chosen from the following compounds:

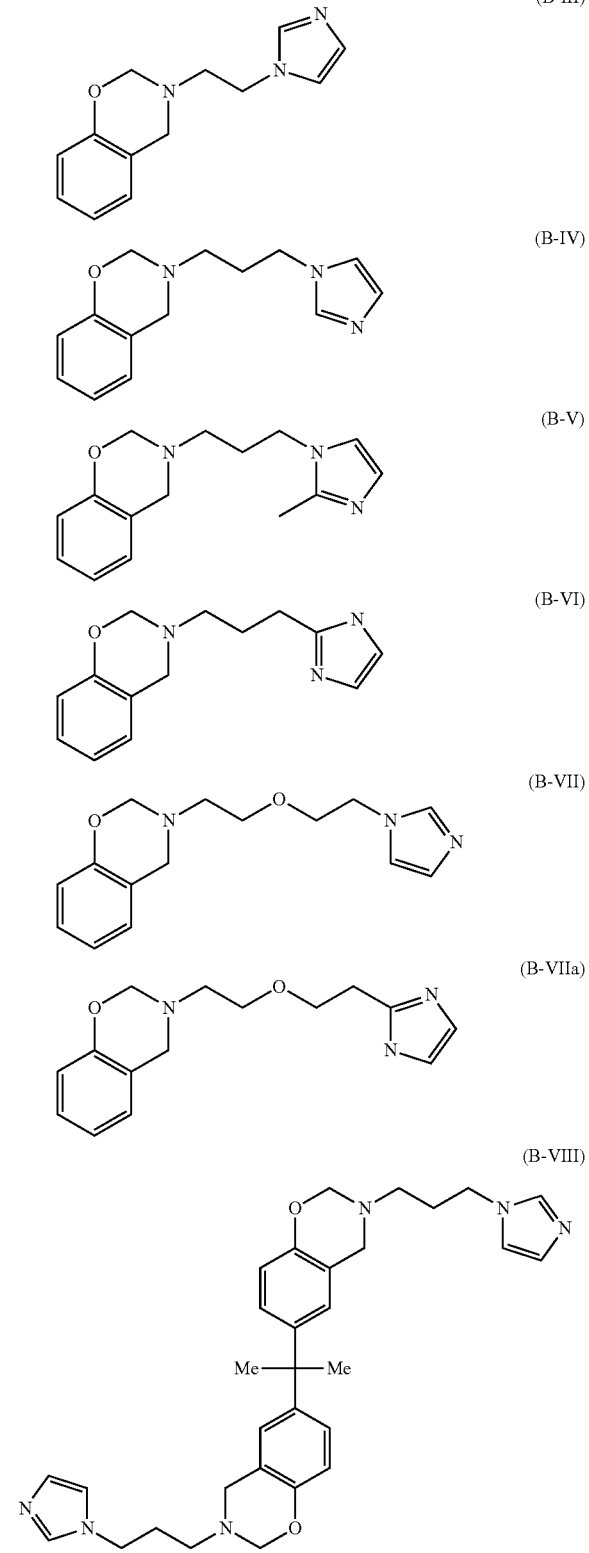

The benzoxazine compounds shown which bear an imidazole ring as the nitrogenous heterocycle can be obtained by reacting a phenolic compound with an aldehyde, such as formaldehyde and an aminoalkylimidazole compound.

Suitable phenolic compounds can be chosen from mono- or diphenolic compounds such as phenol, bisphenol A, bisphenol F, bisphenol S or thiodiphenol.

In addition to formaldehyde, it is also possible to use paraformaldehyde, trioxane or polyoxymethylene or any desired mixtures thereof as the aldehyde.

Preferred aminoalkylimidazole compounds in particular comprise a primary amino group and can be chosen from compounds of general formula (VI)—

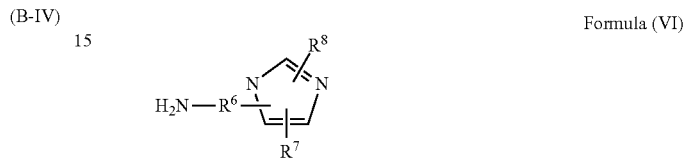

Formula (VI)

wherein $R^6$, $R^7$ and $R^8$ are defined as above.

In particular, 1-aminoalkylimidazole compounds of general formula (VII)—

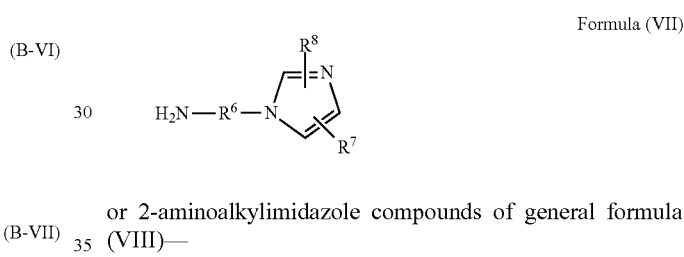

Formula (VII)

or 2-aminoalkylimidazole compounds of general formula (VIII)—

$$H_2N-R^6-\underset{\underset{R^8}{|}}{\overset{N}{\diagup}}\overset{\diagdown}{\underset{\diagdown}{N}}-R^7$$

Formula (VIII)

are suitable for producing the corresponding benzoxazine compounds, wherein $R^6$, $R^7$ and $R^8$ are defined as above.

1-Aminoalkylimidazole compounds of general formula (VII) suitable for the purposes of the present invention are known in the art and are commercially available. Examples include 1-(3-aminopropyl)imidazole, obtainable under the trade name Lupragen® API from BASF SE, 3-imidazol-1-yl-2-methylpropylamine (ChemPacific), 2-methyl-1H-imidazole-1-propanamine (3B Scientific Corporation), 3-imidazol-1-yl-2-hydroxypropylamine (Ambinter, ParisCollection), 1-(4-aminobutyl)imidazole (Ambinter, ParisCollection), 2-ethyl-1H-imidazole-1-propanamine (ChemBridge Corp.).

In addition to using commercially available 1-aminoalkylimidazole compounds of general formula (VII), the compounds can also be produced with the assistance of conventional methods of organic synthesis, such as by a method described in Houben-Weyl, Methoden der organischen Chemie, Vol. E 16d, Georg-Thieme-Verlag Stuttgart (1992) on pages 755 et seq.

2-Aminoalkylimidazole compounds of general formula (VIII) are likewise known from the prior art. Production can proceed with the assistance of conventional methods of organic synthesis. One feasible synthesis is described, for example, in *Tetrahedron* (2005), Vol. 61, pp. 11148 to 11155.

Specific benzoxazine compounds of general formula (V) can be chosen from the following compounds:

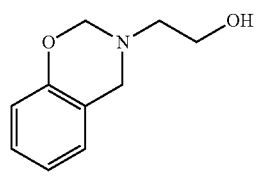
(B-IX)

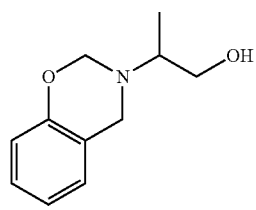
(B-X)

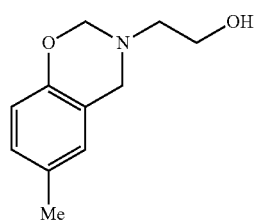
(B-XI)

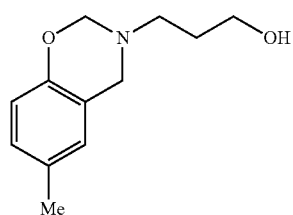
(B-XII)

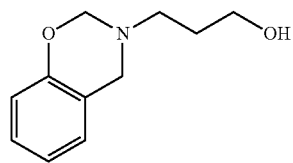
(B-XIII)

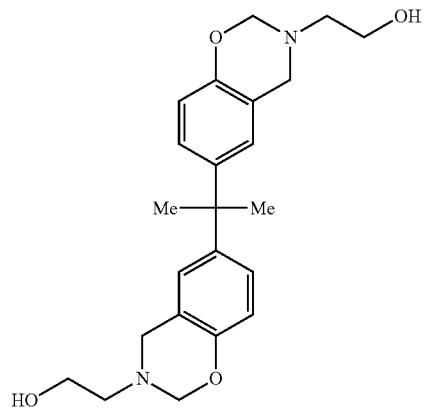
(B-XIV)

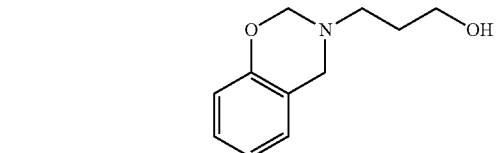
(B-XV)

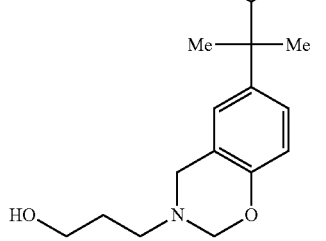
(B-XVI)

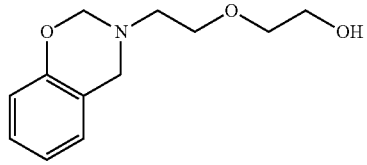
(B-XVII)

The benzoxazine compounds shown having a free hydroxyl group can be obtained by any conventional synthesis method, such as by a method described in Japanese patent application JP 2002-302486 on p. 11, lines 66 to 100. The method involves reacting a phenolic compound with an aldehyde such as formaldehyde and an amino alcohol. The reaction time may here range from a few minutes up to a few hours and is highly dependent on the particular reactivity of the individual reactants.

A further method for producing the indicated benzoxazine compounds having a free hydroxyl group is described by Kiskan and Yagci in *Polymer* 46 (2005), pp. 11690-11697 and by Kiskan, Yagci and Ishida in the *Journal of Polymer Science: Part A: Polymer Chemistry* (2008), Vol. 46, pp. 414-420.

Suitable phenolic compounds can be chosen from mono- or diphenolic compounds such as phenol, bisphenol A, bisphenol F, bisphenol S or thiodiphenol.

In addition to formaldehyde, it is also possible to use paraformaldehyde, trioxane or polyoxymethylene or any desired mixtures thereof as the aldehyde.

Suitable amino alcohols such as 2-aminoethanol, 3-amino-1-propanol, amino-2-propanol, 4-amino-1-butanol, 2-amino-1-butanol, 4-amino-2-butanol, 5-amino-1-pentanol, 6-amino-1-hexanol, 7-amino-1-heptanol, 3-amino-1,2-propanediol, 2-(2-aminoethoxy)ethanol and 2-amino-1,3-propanediol are commercially available and can be obtained, for example, from Sigma-Aldrich or Tokyo Chemical Industry.

The above-stated polymerizable benzoxazine compounds can be used both individually and in any possible combination for producing cationic benzoxazine (co)polymer according to the invention, it being possible to influence important material properties via the particular mixing ratio of the individual polymerizable benzoxazine compounds relative to one another.

In one embodiment, the cationic benzoxazine (co)polymer is produced by providing a mixture having:
- at least one polymerizable benzoxazine compound of general formula (I), preferably at least one polymerizable benzoxazine compound of general formula (III), and
- at least one polymerizable benzoxazine compound of general formula (II).

The weight ratio of the at least one polymerizable benzoxazine compound of general formula (I) to the least one polymerizable benzoxazine compound of general formula (II) is preferably from 10:1 to 1:10, more preferably from 5:1 to 1:5, and particularly from 2:1 to 1:2, a weight ratio of 1:1 being convenient for certain intended applications.

In one specific embodiment, the cationic benzoxazine (co)polymer is produced by providing a mixture having:
- at least one polymerizable benzoxazine compound of general formula (I), preferably at least one polymerizable benzoxazine compound of general formula (III), and
- at least one polymerizable benzoxazine compound of general formula (IV).

The weight ratio of the at least one polymerizable benzoxazine compound of general formula (I) to the least one polymerizable benzoxazine compound of general formula (IV) is preferably from 10:1 to 1:10, more preferably from 5:1 to 1:5, and particularly from 2:1 to 1:2, a weight ratio of 1:1 being convenient for certain intended applications.

In a further specific embodiment of the present invention, the cationic benzoxazine (co)polymer is produced by providing a mixture having:
- at least one polymerizable benzoxazine compound of general formula (I), preferably at least one polymerizable benzoxazine compound of general formula (III), and
- at least one polymerizable benzoxazine compound of general formula (V).

The weight ratio of the at least one polymerizable benzoxazine compound of general formula (I) to the least one polymerizable benzoxazine compound of general formula (V) is preferably from 10:1 to 1:10, more preferably from 5:1 to 1:5 and particularly from 2:1 to 1:2, a weight ratio of 1:1 being convenient for certain intended applications.

It may be appropriate for particular intended applications to use more than two different benzoxazine compounds to produce the cationic benzoxazine (co)polymer according to the invention.

The above-stated mixtures having the stated polymerizable benzoxazine compounds consist in a particularly preferred embodiment of the invention of the stated polymerizable benzoxazine compounds.

In addition to the polymerizable benzoxazine compounds already described, it may be furthermore advantageous to use further polymerizable benzoxazine compounds to produce the cationic benzoxazine (co)polymer according to the invention which differ from the above-stated polymerizable benzoxazine compounds. Suitable benzoxazine compounds are preferably described by formula (B-XVIII)—

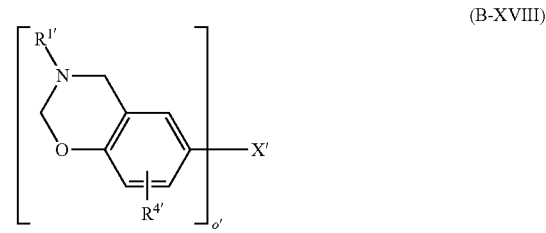

(B-XVIII)

wherein o' is an integer from 1 to 4; X' is chosen from alkyl (where o'=1), alkylene (where o'=2 to 4), oxygen (where o'=2), thiol (where o'=1), sulfur (where o'=2), sulfoxide (where o'=2), sulfone (where o'=2) and a direct, covalent bond (where o'=2); $R^1$ is chosen from hydrogen, alkyl, alkenyl and aryl; and $R^{4'}$ is chosen from hydrogen, halogen, alkyl and alkenyl, or $R^{4'}$ is a divalent residue which makes a corresponding naphthoxazine structure from the benzoxazine structure.

Preferred benzoxazine compounds also include compounds of general formula (B-IXX)—

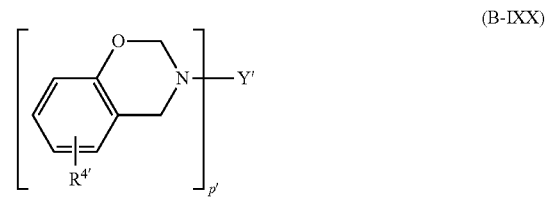

(B-IXX)

wherein p'=2 and Y' is chosen from biphenyl, diphenylmethane, diphenylisopropane, diphenyl sulfide, diphenyl sulfoxide, diphenyl sulfone, diphenyl ketone and $R^{4'}$ is chosen from hydrogen, halogen, alkyl and alkenyl, or $R^{4'}$ is a divalent residue which makes a corresponding naphthoxazine structure from the benzoxazine structure.

Likewise, preferred benzoxazine compounds include compounds of general formulae (B-XX) to (B-XXII)—

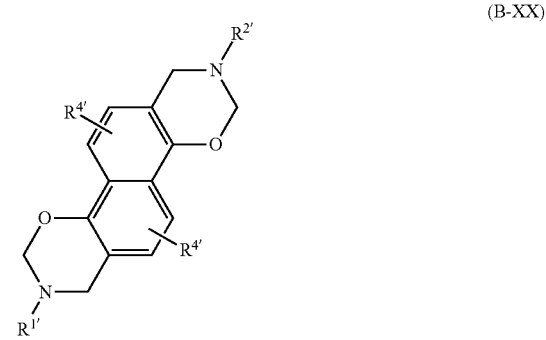

(B-XX)

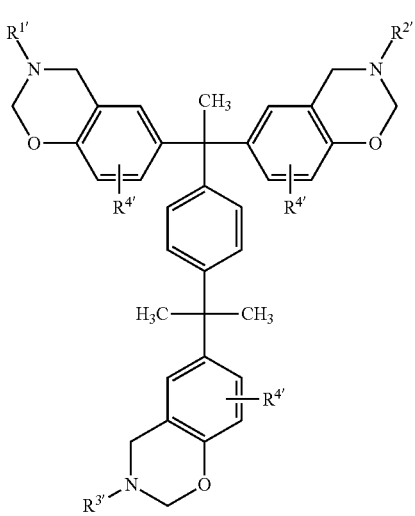

(B-XXI)

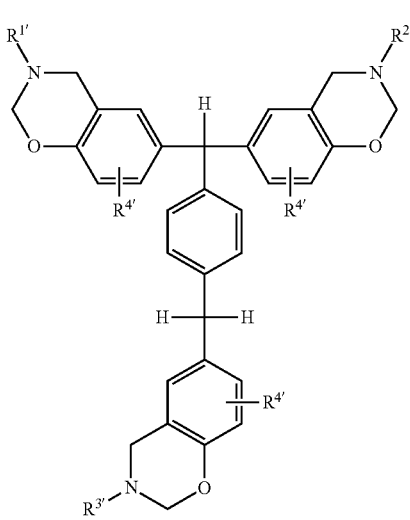

(B-XXII)

wherein $R^{1'}$ and $R^{4'}$ are defined as above while $R^{3'}$ and $R^{2'}$ are defined as $R^{1'}$.

The indicated benzoxazine compounds are commercially obtainable and distributed inter alia by Huntsman Advanced Materials; Georgia-Pacific Resins, Inc. and Shikoku Chemicals Corporation, Chiba, Japan.

Still, the benzoxazine compounds can also be obtained by reacting a phenolic compound (e.g., bisphenol A, bisphenol F, bisphenol S or thiophenol) with an aldehyde (e.g., formaldehyde) in the presence of a primary amine.

Suitable production methods are disclosed, for example, in U.S. Pat. No. 5,543,516, particularly in Examples 1 to 19 in columns 10 to 14, wherein the reaction time of the corresponding reaction can range from a few minutes up to a few hours depending on concentration, reactivity and reaction temperature. Further possible production methods can be found in U.S. Pat. Nos. 4,607,091, 5,021,484, 5,200,452 and 5,443,911.

As has already been explained above, the cationic benzoxazine (co)polymer according to the invention is produced by reacting a non-cationic benzoxazine (co)polymer with at least one alkylating agent.

The non-cationic benzoxazine (co)polymer is obtained by polymerizing at least one of the mentioned benzoxazine compounds under suitable polymerization conditions. Mixtures of two or more of the above-indicated polymerizable benzoxazine compounds are preferably used, so that the benzoxazine (co)polymer is in particular a copolymer of two or more benzoxazine compounds.

For the purposes of the present invention, "suitable polymerization conditions" refers to those conditions suitable for converting the at least one polymerizable benzoxazine compound into the corresponding polymer.

Polymerization of the polymerizable benzoxazine compound or of the mixture of various polymerizable benzoxazine compounds to yield the non-cationic benzoxazine (co) polymer can proceed at elevated temperatures by a self-initiating mechanism (thermal polymerization) or by addition of cationic initiators.

Suitable cationic initiators include Lewis acids or other cationic initiators, such as metal halides, organometallic reagents such as metalloporphyrins, methyl tosylates, methyl triflates or trifluorosulfonic acids. Basic reagents can also be used to initiate polymerization of the polymerizable benzoxazine compound or of the mixture of various polymerizable benzoxazine compounds. Suitable basic reagents can be chosen from imidazole or imidazole derivatives.

Thermal polymerization of the at least one polymerizable benzoxazine compound preferably proceeds at temperatures of 150 to 300° C., particularly at temperatures of 160 to 220° C.

The polymerization temperature can also be lower due to use of the above-mentioned initiators and/or other reagents.

The polymerization process here substantially involves thermally induced ring opening of the oxazine ring of a benzoxazine system.

Alkylation of the non-cationic benzoxazine (co)polymer (step c) for producing the cationic benzoxazine (co)polymer according to the invention can be carried out in a manner known per se. Here, the non-cationic benzoxazine (co)polymer is initially introduced either as a pure substance or as a solution or as a dispersion or emulsion and combined with the particular alkylating agent or a mixture of various alkylating agents. The reaction can be carried out in an alcoholic solution (e.g., ethanol or isopropanol), it likewise being possible to work in the presence of inert emulsifiers or dispersants.

The particular reaction conditions and the quantity of alkylating agent should be chosen so that at least 5% of all the nitrogen atoms, relative to the total number of nitrogen atoms in the non-cationic benzoxazine (co)polymer, are converted into permanently quaternary nitrogen atoms. In particular, the particular reaction conditions and amount of alkylating agent should be chosen so that at least 10%, or at least 15%, or at least 20%, or at least 25%, or at least 30%, or at least 35%, or at least 40%, or at least 45%, or at least 50%, or at least 55%, or at least 60%, or at least 65%, or at least 70%, or at least 75%, or at least 80%, or at least 85%, or at least 90%, or at least 95% of all the nitrogen atoms are converted into permanently quaternary nitrogen atoms.

Alkylating agents which can be considered in this connection are preferably alkyl halides, dialkyl sulfates, dialkyl carbonates and alkylene oxides such as ethylene oxide, the latter in the presence of dialkyl phosphates. Alkylation is preferably carried out with methyl iodide and/or dialkyl sulfates.

The weight-average molecular weight "$M_w$" of cationic benzoxazine (co)polymers according to the invention is preferably from 500 to 100,000 g/mol, more preferably from 1000 to 100,000 g/mol and very preferably from 3000 to 50,000 g/mol. Weight-average molecular weight can be determined by gel permeation chromatography (GPC) with polystyrene as the standard.

Depending on the benzoxazine compounds chosen, the cationic benzoxazine (co)polymer has a linear or branched structure. Linear structures are preferred due to their elevated water solubility and their good capacity to interact with numerous surfaces. Certain branched cationic benzoxazine (co)polymers are, for example, suitable for producing hydrogels.

The present invention also provides a textile or surface treatment agent comprising at least one cationic benzoxazine (co)polymer according to the invention and use of the cationic benzoxazine (co)polymer for improving soil detachment from and/or reducing susceptibility to soil redeposition onto textiles or hard surfaces.

For the purposes of the present invention, particularly preferred textile surfaces include the surfaces of textile fabrics made of wool, silk, jute, hemp, cotton, linen, sisal, ramie; rayon, cellulose esters, polyvinyl derivatives, polyolefins, polyamides, viscose or polyesters or blends thereof. Textile surfaces made from cotton or cotton blend fabrics are very particularly preferred.

For the purposes of the present invention, particularly preferred hard surfaces include surfaces made of porcelain, glass, ceramics, plastics material and/or metal.

The content of the at least one cationic benzoxazine (co) polymer in the textile or surface treatment agent should be calculated so that the surface treated with the agent is adequately covered. The agent preferably contains 0.01 to 20 wt. %, more preferably 0.1 to 10 wt. % and in particular 0.5 to 5 wt. % of the cationic benzoxazine (co)polymer or mixture of various cationic benzoxazine (co)polymers according to the invention, based on total amount of finished agent.

The textile or surface treatment agent of the present invention is preferably in liquid or gel form.

In addition to the cationic benzoxazine (co)polymer according to the invention or mixture of various cationic benzoxazine (co)polymers, the textile or surface treatment agent of the present invention can also include surfactants, particularly those chosen from anionic, cationic, ampholytic and nonionic surfactants and any desired mixtures thereof.

Anionic surfactants generally have an anionic water-solubilizing group such as a carboxylate, sulfate, sulfonate or phosphate group and a lipophilic alkyl group having some 8 to 30 C atoms. The molecule can also contain glycol or polyglycol ether groups, ester, ether and amide groups and hydroxyl groups. Examples of suitable anionic surfactants are, in the form of sodium, potassium and ammonium and the mono-, di- and trialkanolammonium salts having 2 to 4 C atoms in the alkanol group, linear and branched fatty acids with 8 to 30 C atoms (soaps),
ether carboxylic acids of the formula $R^{13}$—O—($CH_2$—$CH_2O)_x$—$CH_2$—COOH, in which $R^{13}$ is a linear alkyl group having 8 to 30 C atoms and x=0 or 1 to 16,
acyl sarcosides having 8 to 24 C atoms in the acyl group,
acyl taurides having 8 to 24 C atoms in the acyl group,
acyl isethionates having 8 to 24 C atoms in the acyl group,
sulfosuccinic acid mono- and dialkyl esters having 8 to 24 C atoms in the alkyl group and sulfosuccinic acid monoalkyl polyoxyethyl esters having 8 to 24 C atoms in the alkyl group and 1 to 6 oxyethyl groups,
linear alkane sulfonates having 8 to 24 C atoms,
linear alpha-olefin sulfonates having 8 to 24 C atoms,
alpha-sulfofatty acid methyl esters of fatty acids having 8 to 30 C atoms,
alkyl sulfates and alkyl polyglycol ether sulfates of the formula $R^{14}$—O($CH_2$—$CH_2O)_x$—$OSO_3H$, wherein $R^{14}$ is preferably a linear alkyl group having 8 to 30 C atoms and x=0 or 1 to 12,
mixtures of surface-active hydroxysulfonates,
sulfated hydroxyalkyl polyethylene glycol ethers and/or hydroxyalkylene propylene glycol ethers,
sulfonates of unsaturated fatty acids having 8 to 24 C atoms and 1 to 6 double bonds,
esters of tartaric acid and citric acid with alcohols, which are addition products of approximately 2-15 molecules of ethylene oxide and/or propylene oxide onto fatty alcohols having 8 to 22 C atoms,
alkyl and/or alkenyl ether phosphates of formula (E1-I)—

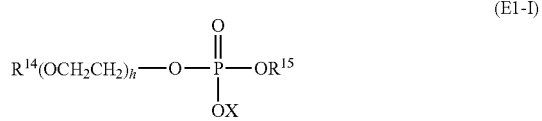

(E1-I)

wherein $R^{14}$ is preferably an aliphatic hydrocarbon residue having 8 to 30 carbon atoms; $R^{15}$ is hydrogen, a residue $(CH_2CH_2O)_nR^{16}$ or X; h is a number from 1 to 10; and X is hydrogen, an alkali or alkaline earth metal or $NR^{17}R^{18}R^{19}R^{20}$, with $R^{17}$ to $R^{19}$ mutually independently being hydrogen or a $C_1$ to $C_4$ hydrocarbon residue, sulfated fatty acid alkylene glycol esters of formula (E1-II)

$$R^{20}CO(AlkO)_hSO_3M \qquad (E1\text{-}II)$$

wherein $R^{20}$CO— is a linear or branched, aliphatic, saturated and/or unsaturated acyl residue with 6 to 22 C atoms; Alk is $CH_2CH_2$, $CHCH_3CH_2$ and/or $CH_2CHCH_3$; h is a number from 0.5 to 5; and M is a cation, monoglyceride sulfates and monoglyceride ether sulfates of formula (E1-III)

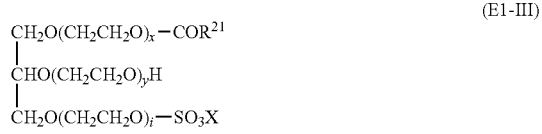

(E1-III)

wherein $R^{21}$CO is a linear or branched acyl residue having 6 to 22 carbon atoms; x, y and i in total are 0 or a number from 1 to 30, preferably 2 to 10; and X is an alkali or alkaline earth metal. Typical examples of monoglyceride (ether) sulfates suitable for the purposes of the invention are the reaction products of lauric acid monoglyceride, coconut fatty acid monoglyceride, palmitic acid monoglyceride, stearic acid monoglyceride, oleic acid monoglyceride and tallow fatty acid monoglyceride and the ethylene oxide addition products thereof with sulfur trioxide or chlorosulfonic acid in the form of the sodium salts thereof. Preferably, monoglyceride sulfates of formula (E1-III) are used wherein $R^{21}$CO is a linear acyl residue having 8 to 18 carbon atoms, amide-ether carboxylic acids,
condensation products prepared from $C_8$-$C_{30}$ fatty alcohols with protein hydrolysates and/or amino acids and the derivatives thereof, known to one skilled in the art as protein/fatty acid condensation products such as Lamepon® grades, Gluadin® grades, Hostapon® KCG or Amisoft® grades.

Preferred anionic surfactants are alkyl sulfates, alkyl polyglycol ether sulfates and ether carboxylic acids having 10 to 18 C atoms in the alkyl group and up to 12 glycol ether groups per molecule, sulfosuccinic acid mono- and dialkyl esters having 8 to 18 C atoms in the alkyl group and sulfosuccinic acid monoalkyl polyoxyethyl esters having 8 to 18 C atoms in the alkyl group and 1 to 6 oxyethyl groups, monoglyceryl disulfates, alkyl and alkenyl ether phosphates and protein/fatty acid condensation products.

According to the invention, preference is given to cationic surfactants of the type including quaternary ammonium compounds, ester quats and amidoamines. Preferred quaternary ammonium compounds are ammonium halides, particularly chlorides and bromides such as alkyltrimethylammonium chlorides, dialkyldimethylammonium chlorides and trialkylmethylammonium chlorides, for example cetyltrimethylammonium chloride, stearyltrimethylammonium chloride, distearyldimethylammonium chloride, lauryldimethylammonium chloride, lauryldimethylbenzylammonium chloride and tricetylmethylammonium chloride, and imidazolium compounds known by the INCI names Quaternium-27 and Quaternium-83. Long alkyl chains of the above-mentioned surfactants preferably have 10 to 18 carbon atoms.

Ester quats are known substances having both at least one ester function and at least one quaternary ammonium group as a structural element. Preferred ester quats are quaternized ester salts of fatty acids with triethanolamine, quaternized ester salts of fatty acids with diethanolalkylamines and quaternized ester salts of fatty acids with 1,2-dihydroxypropyl-dialkylamines. Such products are distributed, for example, under the trademarks Stepantex®, Dehyquart® and Armocare®. The products Armocare® VGH-70, an N,N-bis(2-palmitoyloxyethyl)dimethylammonium chloride, and Dehyquart® F-75, Dehyquart® C-4046, Dehyquart® L80 and Dehyquart® AU-35 are examples of such ester quats.

Alkylamidoamines are conventionally produced by amidating natural or synthetic fatty acids and fatty acid cuts with dialkylaminoamines. One compound from this group of substances which is particularly suitable according to the invention is stearamidopropyldimethylamine, commercially available under the name Tegoamid® S 18.

In addition to or instead of cationic surfactants, the agents can contain further surfactants or emulsifiers, with not only anionic but also ampholytic and nonionic surfactants and all kinds of known emulsifiers being suitable in principle. Ampholytic or also amphoteric surfactants include zwitterionic surfactants and ampholytes. The surfactants may already have an emulsifying action.

Those surface-active compounds having at least one quaternary ammonium group and at least one $—COO^{(-)}$ or $—SO_3^{(-)}$ group on each molecule are designated as zwitterionic surfactants. Particularly suitable zwitterionic surfactants are "betaines" such as N-alkyl-N,N-dimethylammonium glycinates, for example, cocoalkyldimethylammonium glycinate, N-acylaminopropyl-N,N-dimethylammonium glycinates, for example, cocoacylaminopropyldimethylammonium glycinate, and 2-alkyl-3-carboxymethyl-3-hydroxyethylimidazolines having 8 to 18 C atoms in the alkyl or acyl group and cocoacylaminoethylhydroxyethylcarboxymethyl glycinate. One preferred zwitterionic surfactant is the fatty acid amide derivative known by the INCI name Cocamidopropyl Betaine.

Ampholytes refer to surface-active compounds which, in addition to a $C_8$-$C_{24}$ alkyl or acyl group, contain at least one free amino group and at least one $—COOH$ or $—SO_3H$ group per molecule and are capable of forming internal salts.

Examples of suitable ampholytes are N-alkylglycines, N-alkylpropionic acids, N-alkylaminobutyric acids, N-alkyliminodipropionic acids, N-hydroxyethyl-N-alkylamidopropylglycines, N-alkyltaurines, N-alkylsarcosines, 2-alkylaminopropionic acids and alkylaminoacetic acids having approximately 8 to 24 C atoms in the alkyl group. Particularly preferred ampholytes are N-cocoalkyl aminopropionate, cocoacylaminoethyl aminopropionate and $C_{12}$-$C_{18}$ acyl sarcosine.

Nonionic surfactants contain as hydrophilic group, for example, a polyol group, a polyalkylene glycol ether group or a combination of a polyol group and polyglycol ether group. Such compounds include— addition products of 2 to 50 mol of ethylene oxide and/or 1 to 5 mol of propylene oxide onto linear and branched fatty alcohols having 8 to 30 C atoms, onto fatty acids having 8 to 30 C atoms and onto alkylphenols having 8 to 15 C atoms in the alkyl group, addition products, end group-terminated with a methyl or $C_2$-$C_6$ alkyl residue, of 2 to 50 mol of ethylene oxide and/or 1 to 5 mol of propylene oxide onto linear and branched fatty alcohols having 8 to 30 C atoms, onto fatty acids having 8 to 30 C atoms and onto alkylphenols having 8 to 15 C atoms in the alkyl group, such as for example the grades obtainable under the commercial names Dehydol® LS, Dehydol® LT (Cognis), $C_{12}$-$C_{30}$ fatty acid mono- and diesters of addition products of 1 to 30 mol of ethylene oxide onto glycerol, addition products of 5 to 60 mol of ethylene oxide onto castor oil and hardened castor oil, polyol fatty acid esters, such as the commercial product Hydagen® HSP (Cognis) or Sovermol grades (Cognis), alkoxylated triglycerides, alkoxylated fatty acid alkyl esters of formula (E4-I)

$$R^{22}CO—(OCH_2CHR^{23})_w OR^{24} \qquad (E4\text{-}I)$$

wherein $R^{22}CO$ is a linear or branched, saturated and/or unsaturated acyl residue having 6 to 22 carbon atoms; $R^{23}$ is hydrogen or methyl; $R^{24}$ is linear or branched alkyl residues having 1 to 4 carbon atoms; and w is a number from 1 to 20, amine oxides, hydroxy mixed ethers, sorbitan fatty acid esters and addition products of ethylene oxide onto sorbitan fatty acid esters such as polysorbates, sugar fatty acid esters and addition products of ethylene oxide onto sugar fatty acid esters, addition products of ethylene oxide onto fatty acid alkanolamides and fatty amines, sugar surfactants of the alkyl and alkenyl oligoglycoside type of formula (E4-II)—

$$R^{25}O—[G]_p \qquad (E4\text{-}II)$$

wherein $R^{25}$ is an alkyl or alkenyl residue having 4 to 22 carbon atoms; G is a sugar residue having 5 or 6 carbon atoms; and p is a number from 1 to 10. They may be obtained in accordance with the relevant methods of preparative organic chemistry.

Alkyl and alkenyl oligoglycosides can be derived from aldoses or ketoses having 5 or 6 carbon atoms, preferably from glucose. Preferred alkyl and/or alkenyl oligoglycosides are thus alkyl and/or alkenyl oligoglucosides. The index value p in general formula (E4-II) indicates the degree of oligomerization (DP) (i.e., the distribution of mono- and oligoglycosides) and is a number from 1 to 10. While p is always integral in the individual molecule and in this case can primarily assume the values p=1 to 6, the value p for a specific alkyl oligoglycoside is a calculated value determined by analysis and is usually a fractional number. Alkyl and/or alkenyl oligoglycosides having an average degree of oligomerization p of 1.1 to 3.0 are preferably used. From an application standpoint, preferred alkyl and/or alkenyl oligoglycosides are those whose degree of oligomerization is less than 1.7, particularly from 1.2 to 1.4. The alkyl or alkenyl residue $R^{25}$ can be derived from primary alcohols having 4 to 11, preferably 8 to 10 carbon atoms. Typical examples are butanol, caproic alcohol, caprylic alcohol, capric alcohol and undecyl alcohol and the technical mixtures thereof, as obtained, for example, from hydrogenation of technical fatty acid methyl esters or in the course of hydrogenation of aldehydes from Roelen's oxo synthesis. Preferred alkyl oligoglucosides are those of a $C_8$-$C_{10}$ chain length (DP=1 to 3) which occur as forerunnings in the distillative separation of technical $C_8$-$C_{18}$ coconut fatty alcohol and can be contaminated with an amount of less than 6 wt. % of $C_{12}$ alcohol and alkyl oligoglucosides based on technical $C_{9/11}$ oxo alcohols (DP=1 to 3). The alkyl or alkenyl residue $R^{25}$ can also be derived from primary alcohols having 12 to 22, preferably 12 to 14 carbon atoms. Typical examples are lauryl alcohol, myristyl alcohol, cetyl alcohol, palmoleyl alcohol, stearyl alcohol, isostearyl alcohol, oleyl alcohol, elaidyl alcohol, petroselinyl alcohol, arachyl alcohol, gadoleyl alcohol, behenyl alcohol, erucyl alcohol, brassidyl alcohol and the technical mixtures thereof, which can be obtained as described above. Preferred alkyl oligoglucosides are those based on hardened $C_{12/14}$ coconut alcohol with a DP of 1 to 3.

Sugar surfactants of the fatty acid N-alkyl polyhydroxyalkylamide type, a nonionic surfactant of formula (E4-III)—

(E4-III)

wherein $R^{26}CO$ is an aliphatic acyl residue having 6 to 22 carbon atoms; $R^{27}$ is hydrogen, an alkyl or hydroxyalkyl residue having 1 to 4 carbon atoms; and [Z] is a linear or branched polyhydroxyalkyl residue having 3 to 12 carbon atoms and 3 to 10 hydroxyl groups. The fatty acid N-alkyl polyhydroxyalkylamides comprise known substances which can be conventionally obtained by reductive amination of a reducing sugar with ammonia, an alkylamine or an alkanolamine and subsequent acylation with a fatty acid, a fatty acid alkyl ester or a fatty acid chloride. The fatty acid N-alkyl polyhydroxyalkylamides are preferably derived from reducing sugars having 5 or 6 carbon atoms, particularly from glucose. Preferred fatty acid N-alkyl polyhydroxyalkylamides are therefore fatty acid N-alkyl glucamides represented by the formula (E4-IV):

(E4-IV)

Preferred fatty acid N-alkylpolyhydroxyalkylamides are glucamides of formula (E4-IV), wherein $R^{29}$ is hydrogen or an alkyl group, and $R^{28}CO$ is the acyl residue of caproic acid, caprylic acid, capric acid, lauric acid, myristic acid, palmitic acid, palmoleic acid, stearic acid, isostearic acid, oleic acid, elaidic acid, petroselinic acid, linoleic acid, linolenic acid, arachidic acid, gadoleic acid, behenic acid or erucic acid or the technical mixtures of these acids. Particularly preferred fatty acid N-alkyl glucamides of formula (E4-IV) are those obtained by reductive amination of glucose with methylamine and subsequent acylation with lauric acid or $C_{12/14}$ coconut fatty acid or a corresponding derivative. The polyhydroxyalkylamides can also be derived from maltose and palatinose.

Preferred nonionic surfactants include alkylene oxide addition products onto saturated linear fatty alcohols and fatty acids with 2 to 30 mol of ethylene oxide per mol of fatty alcohol or fatty acid respectively. Agents having excellent properties are likewise obtained if they contain fatty acid esters of ethoxylated glycerol as the nonionic surfactants.

These compounds are characterized by the following parameters. The alkyl residue contains 6 to 22 carbon atoms and can be both linear and branched. Primary linear aliphatic residues and those methyl-branched in position 2 are preferred. Alkyl residues such as 1-octyl, 1-decyl, 1-lauryl, 1-myristyl, 1-cetyl and 1-stearyl. 1-Octyl, 1-decyl, 1-lauryl, 1-myristyl are particularly preferred. When "oxo alcohols" are used as starting materials, compounds having an uneven number of carbon atoms in the alkyl chain predominate.

Sugar surfactants can also be present as nonionic surfactants. Compounds with alkyl groups used as surfactant can comprise uniform substances. It is, however, generally preferred to start from native plant or animal raw materials when producing these substances, so that mixtures of substances having differing alkyl chain lengths depending on the particular raw material are obtained.

Surfactants which are addition products of ethylene and/or propylene oxide onto fatty alcohols or derivatives of these addition products can be used both as products with a "normal" homologue distribution and as products with a narrow homologue distribution. A "normal" homolog distribution here refers to mixtures of homologs obtained on reacting fatty alcohol and alkylene oxide using alkali metals, alkali metal hydroxides or alkali metal alkoxides as catalysts. In contrast, narrow homolog distributions are obtained if hydrotalcite, alkaline earth metal salts of ether carboxylic acids, alkaline earth metal oxides, hydroxides or alkoxides are, for example, used as catalysts. It may be preferred to use products with a narrow homologue distribution.

The amount of surfactant in the textile or surface treatment agent according to the invention is highly dependent on the intended application and is preferably in a range from 0.1 to 50 wt. %, more preferably from 0.5 to 25 wt. % and very preferably from 1 to 10 wt. %, based on total amount of the agent.

The textile or surface treatment agent of the present invention can also contain at least one scent which imparts a preferably pleasant and/or fresh scent to the agent. No restrictions apply to the at least one scent. Individual fragrance compounds, whether synthetic or natural compounds of the ester, ether, aldehyde, ketone, alcohol, hydrocarbon, acid, carbonic acid ester, aromatic hydrocarbon, aliphatic hydrocarbon, saturated and/or unsaturated hydrocarbon type and mixtures thereof can accordingly be used as the at least one scent.

Useful scent aldehydes or ketones are any conventional scent aldehydes and ketones typically used for bringing about a pleasant scent impression. Suitable scent aldehydes and ketones are generally known to one skilled in the art. The proportion of the at least one scent in the textile or surface treatment agent according to the invention is preferably from 0.01 to 5 wt. %, more preferably from 0.1 to 3 wt. % and very preferably from 0.5 to 2 wt. %, based on total amount of the agent.

It is preferred to use mixtures of various scents (from the various classes of scents mentioned above) which together produce an attractive scent note. In this case, the total quantity of the at least one scent is the quantity of all the scents in the mixture together, based on total amount of the agent.

In a preferred development of the present invention, the textile or surface treatment agent is a textile treatment agent which can be use for both pre-treating and post-treating textiles and for laundering textiles. The textile treatment agent can be used in both private households and in the textiles industry, it being possible to use cationic benzoxazine (co) polymers according to the invention for both permanent and temporary textile treatment.

In a preferred embodiment of the invention, the textile treatment agent is a washing agent, rinse conditioner, softening washing agent or laundry auxiliary containing, in addition to ingredients already mentioned, further ingredients such as builder substances, bleaching agents, bleach activators, enzymes, electrolytes, nonaqueous solvents, pH adjusting agents, perfume carriers, fluorescent agents, dyes, hydrotropes, foam inhibitors, silicone oils, antiredeposition agents, optical brighteners, graying inhibitors, shrinkage prevention agents, anticrease agents, dye transfer inhibitors, antimicrobial active substances, germicides, fungicides, antioxidants, preservatives, corrosion inhibitors, antistatic agents, bitter agents, ironing aids, waterproofing and impregnation agents, anti-swelling and anti-slip agents, neutral filler salts and UV absorbers.

The present invention also provides a cosmetic agent having, in a cosmetic carrier, at least one cationic benzoxazine (co)polymer according to the invention, as well as use of the polymers for hair conditioning and/or for hair shaping.

As a cosmetic agent, cationic benzoxazine (co)polymers according to the invention are incorporated into a cosmetic carrier.

Preferred cosmetic carriers are aqueous, alcoholic or aqueous/alcoholic media preferably having at least 10 wt. % water, based on total agent. Alcohols which can be present include in particular the lower alcohols with 1 to 4 carbon atoms such as ethanol and isopropanol, which are conventionally used for cosmetic purposes.

Additional cosolvents which can be present are organic solvents or a mixture of solvents with a boiling point of below 400° C. in an amount of 0.1 to 15 wt. %, preferably 1 to 10 wt. % based on total agent. Particularly suitable additional cosolvents are unbranched or branched hydrocarbons such as pentane, hexane, isopentane and cyclic hydrocarbons such as cyclopentane and cyclohexane. Further, particularly preferred water-soluble solvents are glycerol, ethylene glycol and propylene glycol in an amount of up to 30 wt. % based on total agent.

In particular, adding glycerol and/or propylene glycol and/or polyethylene glycol and/or polypropylene glycol increases the flexibility of the polymer film formed on application of the agent according to the invention. Accordingly, if a flexible styling hold is desired, the agents preferably contain 0.01 to 30 wt. % of glycerol and/or propylene glycol and/or polyethylene glycol and/or polypropylene glycol, based on total agent.

Cosmetic agents preferably exhibit a pH value of 2 to 11. The pH range from 2 to 8 is particularly preferred. Details regarding pH value here refer to pH value at 25° C. unless otherwise stated.

Cosmetic agents according to the invention can be formulated in conventional forms, for example, in the form of solutions which can be applied onto the hair as a hair lotion or pump or aerosol spray, in the form of creams, emulsions, waxes, gels, or also surfactant-containing foaming solutions or other preparations suitable for application onto the hair.

In a preferred embodiment, the cosmetic agent additionally contains, particularly if it is used for hair shaping, at least one film-forming and/or setting polymer. The latter differs from cationic benzoxazine (co)polymers according to the invention.

The preferred properties of film-forming polymers include film formation. Film-forming polymers should be understood to mean those polymers which, on drying, leave behind a continuous film on the skin, hair or nails. Such film formers may be used in the most varied of cosmetic products, such as for example face masks, make-up, hair setting preparations, hair sprays, hair gels, hair waxes, hair masks, shampoos or nail polishes. Preferred polymers are in particular those which exhibit sufficient solubility in water or water/alcohol mixtures to be present in the agent according to the invention in completely dissolved form. The film-forming polymers may be of synthetic or natural origin.

Film-forming polymers according to the invention refer to those polymers which are capable, when applied in a 0.01 to 20 wt. % aqueous, alcoholic or aqueous/alcoholic solution, of depositing a transparent polymer film on the hair.

Setting polymers assist in holding or building up the volume and fullness of the overall hairstyle. These polymers are simultaneously also film-forming polymers and therefore generally typical substances for shaping hair treatment agents, such as hair setting preparations, hair mousses, hair waxes, hair sprays. Film formation may in this respect take place only at points and connect only a few fibers together.

The "curl retention" test is frequently used as a test method for the setting action of a polymer.

Since polymers are often multifunctional (i.e., have a plurality of application desirable effects), many polymers are classified in a plurality of groups according to their mode of action, for example, also in the CTFA Handbook.

The cosmetic agent preferably contains at least one film-forming and/or setting polymer chosen from at least one polymer of nonionic polymers, cationic polymers, amphoteric polymers, zwitterionic polymers and anionic polymers, preferably from nonionic, cationic and amphoteric polymers.

The additional film-forming and/or setting polymers are present in the cosmetic agent preferably in an amount of 0.01 wt. % to 10 wt. %, more preferably 0.5 wt. % to 8.0 wt. %, very preferably 0.5 wt. % to 5.0 wt. %, based on total weight of the agent. These quantities also apply to the following preferred types of film-forming and/or setting polymers which can be used in agents according to the invention.

Preferred, nonionic film-forming and/or nonionic hair-setting polymers are homo- or copolymers synthesized from at least one of the following monomers: vinylpyrrolidone, vinylcaprolactam, vinyl esters such as for example vinyl acetate, vinyl alcohol, acrylamide, methacrylamide, alkyl- and dialkylacrylamide, alkyl- and dialkylmethacrylamide, alkyl acrylate, alkyl methacrylate, the alkyl groups of these monomers chosen from ($C_1$ to $C_3$) alkyl groups.

Suitable polymers are in particular homopolymers of vinylcaprolactam or of vinylpyrrolidone (such as Luviskol® K 90 or Luviskol® K 85 from BASF SE), copolymers of vinylpyrrolidone and vinyl acetate (as distributed, for example, under the trademark Luviskol® VA 37, Luviskol® VA 55, Luviskol® VA 64 and Luviskol® VA 73 by BASF SE), terpolymers of vinylpyrrolidone, vinyl acetate and vinyl propionate, polyacrylamides (such as Akypomine® p 191 from CHEM-Y), polyvinyl alcohols (distributed, for example, under the trade names Elvanol® by Du Pont or Vinol® 523/

540 by Air Products), terpolymers of vinylpyrrolidone, methacrylamide and vinylimidazole (such as Luviset® Clear from BASF SE).

In addition to nonionic polymers based on ethylenically unsaturated monomers, cellulose derivatives can also be used in a preferred embodiment of the technical teaching as film-forming and/or setting polymers, preferably chosen from methylcellulose and particularly from cellulose ethers such as hydroxypropylcellulose (e.g., hydroxypropylcellulose with a molecular weight of 30,000 to 50,000 g/mol, distributed, for example, under the tradename Nisso SI® by Lehmann & Voss, Hamburg) and hydroxyethylcellulose, as distributed, for example, under the trademarks Culminal® and Benecel® (AQUALON) and Natrosol® grades (Hercules).

Cationic polymers are polymers having a group in the main and/or side chain which can be "temporarily" or "permanently" cationic. Polymers designated "permanently cationic" according to the invention are those which, regardless of the pH value of the agent, have a cationic group. As a rule, these are polymers having a quaternary nitrogen atom, for example, in the form of an ammonium group. Preferred cationic groups are quaternary ammonium groups. Polymers which have proven particularly suitable are in particular those wherein the quaternary ammonium group is bound via a $C_{1-4}$ hydrocarbon group to a main polymer chain synthesized from acrylic acid, methacrylic acid or the derivatives thereof.

Cosmetic agents according to the invention can also contain at least one surfactant.

The cosmetic agents can also contain at least one conditioner chosen from silicone oil, silicone gum, protein hydrolysate, and vitamin.

Silicone oils or silicone gums suitable according to the invention are in particular dialkyl- and alkylarylsiloxanes, such as dimethylpolysiloxane and methylphenylpolysiloxane, and the alkoxylated, quaternized or anionic derivatives thereof. Preference is given to cyclic and linear polydialkylsiloxanes, the alkoxylated and/or aminated derivatives thereof, dihydroxypolydimethylsiloxanes and polyphenylalkylsiloxanes.

Protein hydrolysates of both plant and animal origin or marine or synthetic origin can be used according to the invention.

Although use of protein hydrolysates as such is preferred, amino acid mixtures obtained in other ways can also optionally be used in their stead. It is likewise possible to use derivatives of protein hydrolysates, for example, in the form of the fatty acid condensation products thereof. Such products are distributed, for example, under the names Lamepon® (Cognis), Lexein® (Inolex), Crolastin® (Croda), Crosilk® (Croda) or Crotein® (Croda).

According to the invention, it is also possible to use a mixture of a plurality of protein hydrolysates.

Protein hydrolysates are present in cosmetic agents according to the invention, for example, in concentrations of 0.01 wt. % to 20 wt. %, preferably 0.05 wt. % to 15 wt. % and very preferably 0.05 wt. % to 5.0 wt. %, based on the total ready-to-use preparation.

The cosmetic agent according to the invention can also contain at least one vitamin, a provitamin, a vitamin precursor and/or one of the derivatives thereof as a conditioner.

Preferred vitamins, provitamins and vitamin precursors according to the invention are those conventionally assigned to groups A, B, C, E, F and H.

The cosmetic agents can be formulated in any forms conventional for cosmetic agents, for example, as solutions which may be applied onto the hair as a hair lotion or pump or aerosol spray, as creams, emulsions, waxes, gels or also surfactant-containing foaming solutions or other preparations suitable for application onto the hair.

For the purposes of the embodiment as a cosmetic agent, however, the agents are preferably agents for temporary deformation of keratin fibers (i.e., styling agents). Preferred styling agents are styling gels, pump hair sprays, aerosol hair sprays, pump hair mousses and aerosol hair mousses.

For the purposes of the present application, styling gel is a superordinate term for clear or cloudy products, styling waxes, styling creams, styling lotions, styling jellies, etc. This term ultimately covers any hair styling agents which are not hair sprays or mousses.

Hair mousses are compositions which form a mousse on discharge from a suitable container. It may be necessary to add to the agents ingredients which promote mousse formation or which stabilize a mousse once it has formed. Surfactants and/or emulsifiers, as described above, are in particular suitable for this purpose. Cationic surfactants are preferably used.

Hair creams and hair gels generally contain structuring agents and/or thickening polymers which impart the desired consistency to the products. Structuring agents and/or thickening polymers are typically used in an amount of 0.1 to 10 wt. %, based on total product. Quantities of 0.5 to 5 wt. %, particularly 0.5 to 3 wt. %, are preferred. However, since the polymer combination used according to the invention exhibits self-thickening properties, it is not absolutely necessary to add further structuring agents and/or thickening polymers. Agents according to the invention preferably contain no further structuring agents and/or thickening polymers.

When agents according to the invention are an aerosol product, they necessarily contain a propellant.

Propellants suitable according to the invention include $N_2O$, dimethyl ether, $CO_2$, air and alkanes with 3 to 5 carbon atoms, such as propane, n-butane, iso-butane, n-pentane, and iso-pentane, and mixtures thereof. Dimethyl ether, propane, n-butane, iso-butane and mixtures thereof are preferred.

The alkanes, mixtures of the alkanes or mixtures of the alkanes with dimethyl ether are preferably used as the sole propellant. The invention does, however, also encompass co-use of propellants of the chlorofluorocarbon type, especially the fluorocarbon type.

With a given spray device, the size of aerosol particles or mousse bubbles and the respective size distribution can be established by the quantity ratio of propellant to other components of the preparations.

The amount of propellant used varies as a function of the specific composition of the agent, of the packaging used and of the desired product type, for example, hair spray or hair mousse. When using conventional spray devices, aerosol mousse products preferably contain propellant in quantities of 1 to 35 wt. %, based on total product. Quantities of 2 to 30 wt. %, particularly 3 to 15 wt. %, are particularly preferred. Aerosol sprays generally contain larger quantities of propellant. In this case, the propellant is preferably used in a quantity of 30 to 98 wt. %, relative to the entire product. Quantities of 40 to 95 wt. %, particularly 50 to 95 wt. %, are particularly preferred.

Aerosol products may be manufactured in conventional manner. In general, all the components of the particular agent with the exception of the propellant are introduced in a suitable pressure-resistant container. The latter is then closed with a valve. The desired quantity of propellant is then introduced using conventional methods.

One method according to the invention wherein the agent is used in the context of hair shaping is distinguished by the following parameters: the cosmetic agent according to the invention is applied onto the hair as a pump hair spray, aerosol hair spray, pump hair mousse, aerosol hair mousse or styling gel and optionally worked into the hair with the palms of the hand and/or the fingers.

The hair can be shaped as desired with the fingers or hands and using suitable, conventional aids such as a comb or brush. In order to assist shaping, once the agent has been applied, the hair may be treated with a heat source such as a hairdryer or hair straightener.

Statements made regarding agents according to the invention apply mutatis mutandis to the method according to the invention.

The agent according to the invention is not rinsed out of the hair after application.

The present invention also provides a method for treating at least one surface comprising the steps:
a) providing at least one cationic benzoxazine (co)polymer according to the invention in an applicable dosage form, and
b) treating at least one surface with the cationic benzoxazine (co)polymer provided in step a).

For the purposes of the present invention, an "applicable dosage form" of the cationic benzoxazine (co)polymer refers to any form of a solution, dispersion or emulsion containing the cationic benzoxazine (co)polymer according to the invention. Preferred aqueous solutions, dispersions or emulsions are in particular those which, relative to the total quantity of the agent, comprise a proportion of water of at least 5 wt. %, preferably at least 50 wt. % and particularly preferably at least 90 wt. %. Alcohol-based solutions, dispersions and emulsions are likewise preferred which, relative to the total quantity of the agent, comprise a proportion of alcohol of at least 5 wt. %, preferably at least 50 wt. % and particularly preferably at least 90 wt. %. Preferred alcohols can be chosen from ethanol, isopropanol or any desired mixtures thereof. The solutions, dispersions or emulsions mentioned can also contain any desired mixtures of water and water-miscible alcohols, such as water/ethanol and water/propanol mixtures.

Different surfaces can be provided with different properties by being treated with the cationic benzoxazine (co)polymer according to the invention or with an agent comprising the cationic benzoxazine (co)polymer.

Preferred surfaces are chosen from carbon fibers, hard surfaces, textiles surfaces and keratin fibers.

Carbon fibers are used inter alia for producing fiber-reinforced composite materials. Being mixed materials, fiber-reinforced composite materials generally consist of at least two components. In addition to a resin component, fiber-reinforced composite materials comprise a carbon fiber component, which can consist of unidirectional or also woven or short fibers. In combination with the resin component used, the carbon fiber component used imparts elevated strength, for which reason fiber-reinforced composite materials are used as composite materials in fields of application with stringent requirements for structural material properties, such as in aerospace or automotive construction.

If a high quality, stable fiber-reinforced composite material is to be formed on a large industrial scale, it must be possible for numerous carbon fiber bundles assembled from several thousand filaments to be readily and completely wetted with the particular matrix resin in an impregnation process. However, since carbon fibers have low ductility and are brittle, they readily become frayed as a result of mechanical friction and often exhibit poor wettability with respect to the matrix resins used. Carbon fibers used as reinforcing materials for fiber-reinforced composite material are usually pre-treated with a sizing agent in order to improve them.

Carbon fibers which are treated with the cationic benzoxazine (co)polymer according to the invention, for example, in the form of an aqueous solution, emulsion or dispersion, exhibit improved handleability in the production process for fiber-reinforced composite materials. Furthermore, the treated carbon fibers exhibit improved wettability with the particular matrix resin. In particular, wettability of the carbon fibers in relation to benzoxazine-based resin systems is improved.

The present invention accordingly also provides for use of cationic benzoxazine (co)polymers according to the invention as a sizing agent, particularly as a sizing agent for carbon fibers. The cationic benzoxazine (co)polymers can also be used as a sizing agent for textile fibers or textile fabrics.

Hard surfaces which can be treated with cationic benzoxazine (co)polymer according to the invention can, for purposes of the present invention, preferably be chosen from porcelain, glass, ceramics, plastics material and/or metal.

Improved adhesion of various materials, such as coating materials or adhesives, can be observed on surfaces treated in this manner.

The present invention accordingly also provides for use of cationic benzoxazine (co)polymers according to the invention as a coupling agent, particularly as a coupling agent for coating materials and adhesives.

Textile surfaces or hard surfaces which can be treated with cationic benzoxazine (co)polymer according to the invention can, for purposes of the present invention, be chosen from textile fabrics or from the above-stated hard surfaces.

Particularly preferred textile surfaces are textile fabrics made of wool, silk, jute, hemp, cotton, linen, sisal, ramie; rayon, cellulose esters, polyvinyl derivatives, polyolefins, polyamides, viscose or polyesters or blends thereof be selected. Textile surfaces made from cotton or cotton blend fabrics are very particularly preferred.

Textiles or hard surfaces treated in this manner are distinguished by reduced susceptibility to soil redeposition and by improved soil detachment properties. The present invention accordingly also provides for use of cationic benzoxazine (co)polymers according to the invention for improving soil detachment from and/or for reducing susceptibility to soil redeposition onto textiles or hard surfaces.

Due to the particular chemical structure thereof, after treatment with cationic benzoxazine (co)polymer according to the invention, the surfaces exhibit a lower level of contamination with harmful microorganisms compared to untreated surfaces. The present invention accordingly also provides for use of cationic benzoxazine (co)polymers according to the invention for coating surfaces, particularly for antibacterial coating of surfaces.

EXAMPLES

1. Production of Polymerizable Benzoxazine Compounds Using Jeffamines

The production of various polymerizable benzoxazine compounds of formula (B-Box-I) is described below.

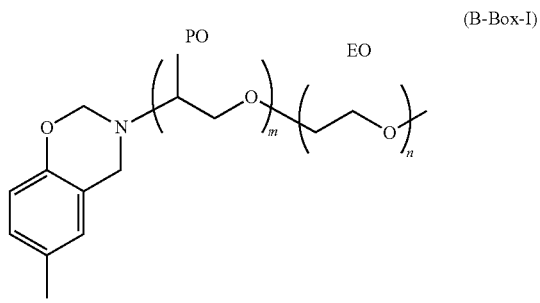

(B-Box-I)

1.1. Production of a Polymerizable Benzoxazine Compound Using Jeffamine M2070 (PO/EO 10/31); Name (B-Box-I-1.1)

Reaction batch:

| | |
|---|---|
| 9.38 g of paraformaldehyde (96%) in 50 ml of ethyl acetate | 0.30 mol |
| 309.9 g of Jeffamine M2070 (Huntsman) in 200 ml of ethyl acetate | 0.15 mol |
| 16.22 g of p-cresol in 50 ml of ethyl acetate | 0.15 mol |

The paraformaldehyde was initially introduced into ethyl acetate and the p-cresol, also dissolved in ethyl acetate, was added dropwise within 10 minutes. Jeffamine M-2070 was then added within 30 minutes, the temperature being kept below 10° C. After 10 minutes of further stirring, the reaction mixture was refluxed for 6 hours. After cooling, the reaction mixture was filtered and solvent and water which had arisen were removed under vacuum. 318.90 g of the corresponding polymerizable benzoxazine compound B-Box-I-1.1 was obtained.

1.2 Production of a Polymerizable Benzoxazine Compound Using Jeffamine M1000 (PO/EO 3/19), Name (B-Box-I-1.2)

Reaction batch:

| | |
|---|---|
| 18.7 g of paraformaldehyde (96%) in 50 ml of ethyl acetate | 0.60 mol |
| 312.9 g of Jeffamine M1000 (Huntsman) in 250 ml of ethyl acetate | 0.30 mol |
| 32.44 g of p-cresol in 60 ml of ethyl acetate | 0.30 mol |

The paraformaldehyde was initially introduced into ethyl acetate and the p-cresol, also dissolved in ethyl acetate, was added dropwise within 10 minutes. Jeffamine M-100 was then added within 30 minutes, the temperature being kept below 10° C. After 10 minutes of further stirring, the reaction mixture was refluxed for 6 hours. After cooling, the reaction mixture was filtered and solvent and water which had arisen were removed under vacuum. 352.57 g of the corresponding polymerizable benzoxazine compound B-Box-I-1.2 was obtained.

1.3 Production of a Polymerizable Benzoxazine Compound Using N-(3-aminopropyl)imidazole The production of a polymerizable benzoxazine compound of formula (B-Box-II) is described below:

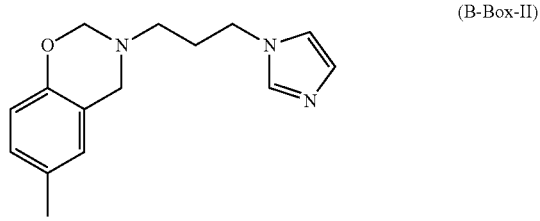

(B-Box-II)

Reaction batch:

| | |
|---|---|
| 78.20 g of paraformaldehyde (96%) in 100 ml of ethyl acetate | 2.50 mol |
| 157.5 g of N-(3-aminopropyl)-imidazole (Lupragen API, BASF SE) in 10 ml of ethyl acetate | 1.25 mol |
| 135.17 g of p-cresol in 100 ml of ethyl acetate | 1.25 mol |

The paraformaldehyde was initially introduced into ethyl acetate and the p-cresol, also dissolved in ethyl acetate, was added dropwise within 10 minutes. Lupragen-API® was then added within 30 minutes, the temperature being kept below 10° C. After 10 minutes of further stirring, the reaction mixture was refluxed for 6 hours. After cooling, the reaction mixture was filtered and solvent and water which had arisen were removed under vacuum. 322.74 g of the corresponding polymerizable benzoxazine compound B-Box-II was obtained.

1.4 Production of a Polymerizable Benzoxazine Compound Using Ethanolamine

The production of a polymerizable benzoxazine compound of formula (B-Box-III) is described below:

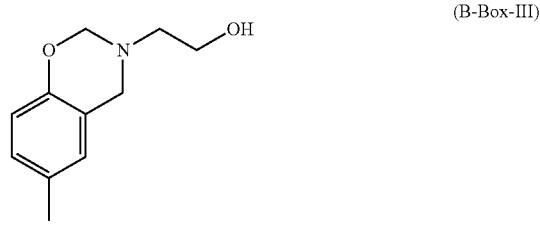

(B-Box-III)

Reaction batch:

| | |
|---|---|
| 106.35 g of paraformaldehyde (96%) in 100 ml of ethyl acetate | 3.40 mol |
| 103.87 g of ethanolamine in 30 ml of ethyl acetate | 1.70 mol |
| 183.84 g of p-cresol in 80 ml of ethyl acetate | 1.70 mol |

The paraformaldehyde was initially introduced into ethyl acetate and the p-cresol, also dissolved in ethyl acetate, was added dropwise within 10 minutes. Ethanolamine was then added within 30 minutes, the temperature being kept below 10° C. After 10 minutes of further stirring, the reaction mixture was refluxed for 6 hours. After cooling, the reaction mixture was filtered and solvent and water which had arisen were removed under vacuum. 328.6 g of the corresponding polymerizable benzoxazine compound B-Box-III was obtained.

2. Polymerization to Produce Non-Cationic Benzoxazine (Co)Polymers

The above-described polymerizable benzoxazine compounds were thermally cured individually or as mixtures to form moldings at 180° C. within 2 hours in a drying cabinet with air circulation. Specimens were then taken from the moldings and cooled to room temperature. In this manner, non-cationic benzoxazine (co)polymers of the composition shown in Table 1 were produced.

TABLE 1

Proportion of the respective polymerizable benzoxazine compounds in the non-cationic benzoxazine (co)polymer

| | Proportion by weight of the respective polymerizable benzoxazine compounds in % | | | |
|---|---|---|---|---|
| Polymer | B-Box-I-1.2 | B-Box-I-1.1 | B-Box-II | B-Box-III |
| 1 | 100 | | | |
| 2 | | 100 | | |
| 3 | | | 100 | |
| 4 | | | | 100 |

TABLE 1-continued

Proportion of the respective polymerizable benzoxazine
compounds in the non-cationic benzoxazine (co)polymer Proportion by weight of the respective
polymerizable benzoxazine compounds in %

| Polymer | B-Box-I-1.2 | B-Box-I-1.1 | B-Box-II | B-Box-III |
|---|---|---|---|---|
| 5 | | 30 | | 70 |
| 6 | | 50 | | 50 |
| 7 | 30 | | | 70 |
| 8 | 50 | | | 50 |
| 9 | | 30 | 70 | |
| 10 | | 50 | 50 | |
| 11 | 70 | | 30 | |
| 12 | 50 | | 50 | |
| 13 | | 30 | 35 | 35 |
| 14 | | 50 | 25 | 25 |
| 15 | 30 | | 35 | 35 |
| 16 | 50 | | 25 | 25 |

3. Alkylation of Non-Cationic Benzoxazine (Co)Polymers to Produce Cationic Benzoxazine (Co)Polymers 3.1 Alkylation of Non-Cationic Benzoxazine (Co)Polymer 3 with Dimethyl Sulfate to Produce Cationic Benzoxazine (Co)Polymer alk-3

28.0 g of the non-cationic benzoxazine (co)polymer 3 (100 wt. % B-Box-II) in 60 ml of ethanol were slowly combined with stirring with 26.3 g of dimethyl sulfate. After 10 minutes of further stirring, the reaction mixture was refluxed for 3.5 hours. The reaction mixture was then stirred for 4 days at 22° C. under nitrogen atmosphere and then poured into 600 ml of diethyl ether. The precipitate was separated and dried for 24 hours at 80° C. in a vacuum drying cabinet.

48.7 g of the cationic benzoxazine (co)polymer alk-3 were obtained. NMR spectroscopic methods revealed that at least 5% of all nitrogen atoms, relative to the total number of nitrogen atoms in the above-mentioned cationic benzoxazine (co)polymer, are present in the form of permanently quaternary nitrogen atoms.

3.2 Alkylation of Non-Cationic Benzoxazine (Co)Polymer 8 with Methyl Iodide to Produce Cationic Benzoxazine (Co) Polymer alk-8

5.0 g of the non-cationic benzoxazine (co)polymer 8 (50 wt. % B-Box-1.2 and 50 wt. % B-Box-III) in 6 ml of ethanol were combined slowly with stirring with a solution of 6.86 g of methyl iodide in 4 ml of ethanol. The reaction mixture was then stirred for 24 hours at 22° C. under nitrogen atmosphere and then poured into 60 ml of diethyl ether. The precipitate was separated and dried for 24 h at 120° C. in a vacuum drying cabinet.

5.2 g of the cationic benzoxazine (co)polymer alk-8 were obtained. NMR spectroscopic methods revealed that at least 5% of all the nitrogen atoms, relative to the total number of nitrogen atoms in the above-mentioned cationic benzoxazine (co)polymer, are present in the form of permanently quaternary nitrogen atoms.

3.3 Alkylation of Non-Cationic Benzoxazine (Co)Polymer 11 with Dimethyl Sulfate to Produce Cationic Benzoxazine (Co)Polymer alk-11

10.6 g of the non-cationic benzoxazine (co)polymer 11 (70 wt. % B-Box-1.2 and 30 wt. % B-Box-II) in 10 ml of ethanol were slowly combined with stirring with 1.9 g of dimethyl sulfate. After 10 minutes of further stirring, the reaction mixture was refluxed for 3.5 hours.

The reaction mixture was then stirred for 24 hours at 22° C. under nitrogen atmosphere and then poured into 100 ml of diethyl ether. The precipitate was separated and dried for 24 hours at 80° C. in a vacuum drying cabinet.

The cationic benzoxazine (co)polymer alk-11 was obtained. NMR spectroscopic methods revealed that at least 5% of all the nitrogen atoms, relative to the total number of nitrogen atoms in the above-mentioned cationic benzoxazine (co)polymer, are present in the form of permanently quaternary nitrogen atoms.

4. Water Solubility of the Cationic Benzoxazine (Co)Polymers

At least 0.1 g of cationic benzoxazine (co)polymer alk-3, alk-8 or alk-11 dried under a vacuum were weighed out together with at most 9.9 g of water (pH=7) into a 25 ml screw-top jar. The mixtures were then stirred at 70° C. for at least 5 minutes (magnetic stirrer) and then stirred at 22° C. for a further 45 minutes. Under these conditions, the cationic benzoxazine (co)polymers of the present invention can be taken up in a quantity of at least 10 g/1000 g of water without turbidity. Furthermore, the above-stated cationic benzoxazine (co)polymers exhibit improved solubility in water (at 22° C. and pH=7) in comparison with corresponding non-cationic benzoxazine (co)polymers.

5. Cosmetic Formulations

The following formulations were prepared using known production methods. Unless otherwise stated, all quantities are stated in weight percent relative to total weight of the respective agent. The technical data for the raw materials used are those shown on the respective manufacturer's raw material datasheet valid at the time of application.

5.1 Oxidative Color Modifying Agents

A ready-to-use dyeing agent was produced by stirring 50 g of a dye cream from the table of dye creams shown below with 50 g of a developer according to the developer table. Three different application mixtures were produced from each dye cream with the assistance of one of the three developers according to the developer table. Three different application mixtures, which differed only with regard to hydrogen peroxide content, were obtained from each dye cream. On application onto head hair and with a period of exposure of 30 minutes, an excellent dyeing result or, for F6, a lightening result was observed after rinsing and drying.

Dye Creams

| | F1 | F2 | F3 | F4 | F5 | F6 |
|---|---|---|---|---|---|---|
| Hydrenol D | 5.50 | 8.50 | — | 8.10 | 7.15 | 7.15 |
| Lorol 16 | 2.00 | 2.00 | 8.00 | 2.70 | 2.60 | 2.60 |
| Isostearic acid | — | — | — | 2.00 | — | — |

-continued

|  | F1 | F2 | F3 | F4 | F5 | F6 |
|---|---|---|---|---|---|---|
| Edenor C14 98/100 | — | — | — | 0.50 | — | — |
| Eumulgin B1 | 0.50 | 0.75 | — | 0.50 | 0.65 | 0.65 |
| Eumulgin B2 | 0.50 | — | — | 0.50 | 0.65 | 0.65 |
| Mergital CS 50 A | — | — | 5.00 | — | — | — |
| Dehydol LS 2 deo N | — | — | 4.90 | — | — | — |
| Edenor PK 1805 | — | — | 6.75 | — | — | — |
| Lamesoft PO 65 | 2.00 | — | — | — | — | — |
| Akypo Soft 45 NV | 10.00 | — | — | — | 10.00 | 10.00 |
| Protelan MST 35 | — | — | — | — | 6.00 | 6.00 |
| Texapon K 14 S, 70% | 2.80 | — | — | — | — | — |
| Texapon NSO UP | — | 15.00 | 4.50 | 7.00 | — | — |
| Amphoteric K-2 | — | — | 1.00 | — | — | — |
| Dehyton K | — | 12.50 | — | 5.00 | — | — |
| Cationic benzoxazine (co)polymer alk-3 | — | 0.40 | — | 0.30 | — | 0.50 |
| Cationic benzoxazine (co)polymer alk-8 | 0.50 | — | — | 0.30 | — | — |
| Cationic benzoxazine (co)polymer alk-11 | — | 0.10 | 0.60 | — | 0.50 | — |
| Ammonia, 25% | 6.50 | 1.50 | — | 7.30 | — | — |
| 2-Aminoethanol | — | — | 4.50 | — | 6.30 | 6.30 |
| Potassium hydroxide | — | — | — | 1.20 | 1.00 | 1.00 |
| L-Arginine | — | 1.00 | 1.00 | — | — | — |
| Turpinal SL | 0.20 | 0.20 | 0.20 | 0.20 | 0.20 | 0.20 |
| 1,2-Propanediol | — | — | 6.75 | — | — | — |
| Isopropanol | — | — | 14.50 | — | — | — |
| 2-Phenoxyethanol | — | 0.60 | — | — | — | — |
| Methylparaben | — | 0.15 | — | — | — | — |
| Propylparaben | — | 0.15 | — | — | — | — |
| Sodium silicate 40/42 | — | 0.50 | — | 0.50 | 0.50 | 0.50 |
| p-Toluenediamine sulfate | 1.40 | 0.50 | 0.30 | 1.00 | 1.10 | — |
| 4-Amino-3-methylphenol | — | 0.20 | — | — | — | — |
| Resorcinol | 0.50 | — | 0.03 | 0.10 | — | — |
| 4-Chlororesorcinol | — | 0.20 | 0.10 | — | — | — |
| 2-Methylresorcinol | — | 0.60 | 0.15 | 0.50 | 0.10 | — |
| 2,7-Dihydroxynaphthalene | — | 0.40 | — | — | 0.30 | — |
| 2,4,5,6-Tetraaminopyrimidine sulfate | — | 1.40 | — | 1.00 | — | — |
| 2-Amino-4-(2-hydroxyethyl)aminoanisole sulfate | — | 0.01 | — | — | — | — |
| 3-Amino-2-methylamino-6-methoxypyridine | — | — | 0.05 | 0.10 | — | — |
| 2-Amino-3-hydroxypyridine | — | — | — | — | 0.07 | — |
| m-Aminophenol | 0.10 | — | — | 0.05 | — | — |
| 2-Amino-6-chloro-4-nitrophenol | — | 0.10 | — | — | — | — |
| Ascorbic acid | 0.10 | 0.40 | 0.20 | 0.40 | 0.10 | 0.10 |
| Sodium sulfite, 96% | 0.40 | 0.40 | 0.20 | 0.50 | 0.40 | 0.40 |
| Ammonium sulfate | 0.16 | — | — | 0.30 | — | — |
| Ammonium dihydrogenphosphate | — | 0.80 | — | — | — | — |
| Glycine | — | — | — | 1.20 | 1.00 | 1.00 |
| Quaternium-91 | 1.00 | 1.00 | 1.00 | 1.00 | 1.00 | 1.00 |
| Quaternium-27 | 1.00 | 1.00 | 1.00 | 1.00 | 1.00 | 1.00 |
| PPG-3 Benzyl Ether Myristate | 0.3 | 0.3 | 0.3 | 0.3 | 0.3 | 0.3 |
| Akypoquat 131 | 0.5 | 0.8 | 1.0 | 1.0 | 0.5 | 0.3 |
| Tegoamid S 18 | 0.5 | 1.0 | 1.5 | 0.8 | 1.0 | 1.0 |
| Dehyquart L 80 | 0.8 | 0.8 | 0.8 | 0.8 | 0.8 | 0.8 |
| Dow Corning 200, 60000 cSt | 0.3 | 0.2 | 0.1 | 0.25 | 0.2 | 0.1 |
| Dow Corning 200 fluid, 0.65 cSt | 0.2 | 0.2 | 0.2 | 0.2 | 0.1 | 0.1 |
| Ectoin | 1.00 | 1.00 | 1.00 | 1.00 | 1.00 | 1.00 |
| Taurine | 1.00 | 1.25 | 1.50 | 2.00 | 1.50 | 1.50 |
| Extrapone White Tea GW | 0.1 | 0.1 | 0.1 | 0.1 | 0.1 | 0.1 |
| Water | <-------------------- Ad 100 --------------------> | | | | | |

Developers

|  | E1 | E2 | E3 |
|---|---|---|---|
| Dipicolinic acid | 0.10 | 0.10 | 0.10 |
| Disodium pyrophosphate | 0.03 | 0.03 | 0.03 |
| Turpinal SL | 1.50 | 1.50 | 1.50 |
| Texapon NSO UP | 2.00 | 2.00 | 2.00 |
| Dow Corning 200, 60000 cSt | 0.1 | 0.1 | — |
| Dow Corning 200 fluid, 0.65 cSt | 0.1 | — | 0.1 |
| Aculyn 33A | 12.00 | 12.00 | 12.00 |
| Hydrogen peroxide, 50% | 12.00 | 20.00 | 24.00 |
| Water | Ad 100 | | |

5.2 Shampoos

|  | S-1 | S-2 | S-3 | S-4 |
|---|---|---|---|---|
| Texapon N70 | 15.0 | 15.0 | 15.0 | 15.00 |
| Incromine BB | 0.3 | 0.5 | 0.8 | 1.0 |
| Antil 141 L | — | — | 1.0 | 1.0 |
| Gluadin WQ | — | — | 0.3 | 0.3 |
| DC 193 Fluid | — | — | 0.5 | 0.5 |
| Quaternium-91 | 0.1 | 0.1 | 0.1 | 0.1 |
| PPG-3 Benzyl Ether Myristate | 0.1 | 0.1 | 0.1 | 0.1 |
| Cationic benzoxazine (co)polymer alk-3 | 0.5 | — | — | 0.3 |
| Cationic benzoxazine (co)polymer alk-8 | — | 0.5 | — | — |

|  | S-1 | S-2 | S-3 | S-4 |
|---|---|---|---|---|
| Cationic benzoxazine (co)polymer alk-11 | — | — | 0.5 | 0.2 |
| Lexquat AMG-BEO | 0.05 | 0.05 | 0.2 | 0.2 |
| Quaternium-72 | 0.1 | 0.1 | 0.1 | 0.1 |
| Dehyquart L 80 | — | 1.0 | — | 1.0 |
| Rewoteric RTM 50 | 1.0 | — | 1.0 | |
| Abilquat 3272 | 0.8 | 1.5 | 0.5 | 1.0 |
| Lamesoft PO 65 | 0.3 | 0.3 | — | — |
| Dow Corning 200, 60000 cSt | — | 0.1 | 0.1 | — |
| Dow Corning 200 fluid, 0.65 cSt | 0.1 | 0.1 | 0.1 | 0.1 |
| Sodium benzoate | 0.5 | 0.5 | 0.5 | 0.5 |
| Dehyton PS | 6.0 | 6.0 | 6.0 | 6.0 |
| Salicylic acid | 0.2 | 0.2 | 0.2 | 0.2 |
| Euperlan PK 3000 AM | 2.0 | 2.0 | — | — |
| D-Panthenol | 0.1 | 0.1 | — | — |
| Nicotinamide | 0.1 | 0.1 | — | — |
| Cetiol HE | 0.3 | 0.3 | 1.5 | 1.5 |
| Cremophor CO 40 | — | — | 2.0 | 2.0 |
| Polyquaternium-10 | 0.2 | 0.2 | 0.5 | 0.5 |
| Sodium chloride | 1.5 | 1.5 | 0.3 | 0.3 |
| Litchiderm LS 9704 | 0.1 | 0.5 | 0.05 | 0.2 |
| Ectoin | 0.1 | 0.5 | 0.3 | 0.3 |
| Taurine | 0.5 | 1.0 | 0.25 | 0.75 |
| Extrapone White Tea GW | 0.1 | 0.5 | 0.05 | 0.2 |
| Water | Ad 100 | Ad 100 | Ad 100 | Ad 100 |

5.3 Shine Tonic

|  | T-1 | T-2 | T-3 | T-4 |
|---|---|---|---|---|
| Schercoquat BAS | 1.0 | 1.0 | 1.0 | 1.0 |
| Polyquart H 81 | 2.0 | 2.0 | — | — |
| Quaternium-91 | 0.5 | 0.5 | 1.0 | 1.0 |
| PPG-3 Benzyl Ether Myristate | 0.3 | 0.3 | 0.5 | 0.5 |
| Adogen S18 | 0.3 | — | 0.5 | — |
| Dow Corning 949 | 0.3 | — | 0.3 | — |
| Quaternium-83 | 0.5 | 0.5 | 0.8 | 0.8 |
| Armovare VGH 70 | — | 0.3 | — | 0.8 |
| Abilquat 3270 | 0.5 | 0.5 | 0.5 | 0.5 |
| Cremophor CO 40 | 2.0 | 2.0 | — | — |
| Phenoxyethanol | 0.4 | 0.4 | — | — |
| Citric acid | 0.5 | 0.5 | — | — |
| Isopropanol | — | — | 6.0 | 6.4 |
| Dow Corning 200, 60000 cSt | 0.5 | 1.0 | 1.0 | 2.0 |
| DC 200 Fluid | 1.0 | 1.0 | 2.0 | 2.0 |
| Cationic benzoxazine (co)polymer alk-3 | — | 0.6 | — | — |
| Cationic benzoxazine (co)polymer alk-8 | — | — | 0.3 | 0.5 |
| Cationic benzoxazine (co)polymer alk-11 | 0.5 | — | 0.4 | — |
| Cashew oil | 0.1 | 0.1 | 0.1 | 0.1 |
| Cetiol J 600 | 0.5 | 0.3 | — | 1.0 |
| n-Butane | — | — | 91.5 | 91.5 |
| Litchiderm LS 9704 | 0.1 | 0.5 | 0.5 | 0.1 |
| Ectoin | 0.1 | 0.5 | 0.5 | 0.1 |
| Taurine | 0.3 | 0.5 | 0.5 | 0.3 |
| Extrapone White Tea GW | 0.1 | 0.5 | 0.1 | 0.1 |
| Water | Ad 100 | Ad 100 | Ad 100 | Ad 100 |

5.4 Conditioner

|  | Sp-1 | Sp-2 | Sp-3 | Sp-4 |
|---|---|---|---|---|
| Cutina GMS-V | 0.3 | 0.3 | 0.2 | 0.2 |
| Dehyquart F 75 | 3.8 | 0.8 | 1.0 | 1.0 |
| Lanette O | 4.0 | 4.0 | 3.0 | 3.0 |
| Eumulgin B2 | 0.2 | 0.2 | 0.3 | 0.3 |
| Paraffinum Liquidum | 0.8 | 0.8 | | |
| Varisoft W 575 PG | | | 4.0 | 4.0 |
| Quaternium-91 | 3.5 | 4.0 | 2.5 | 3.0 |
| PPG-3 Benzyl Ether Myristate | 0.5 | 0.5 | 0.8 | 0.8 |
| Incroquat Behenyl HE | 2.0 | 2.0 | 2.0 | 2.0 |
| Dow Corning 200, 60000 cSt | 1.0 | 0.5 | 1.5 | 0.3 |
| Dow Corning 200 fluid, 0.65 | 0.5 | 0.5 | 0.3 | 0.1 |
| Isopropyl myristate | | | 1.0 | 1.0 |
| Marula oil | 0.1 | 0.1 | — | 0.1 |
| Pistachio oil | 0.1 | — | 0.1 | — |
| "Pink Pepper" oil | 0.1 | 0.1 | 0.1 | 0.1 |
| Cashew oil | 0.1 | 0.1 | 0.1 | 0.1 |
| Tego Amid S 18 | 1.5 | 2.0 | 0.3 | 0.3 |
| Empigen CSC | 0.5 | 0.75 | 1.5 | 2.0 |
| Salcare SC 96 | 0.4 | 0.3 | 0.6 | 0.6 |
| Citric acid | | | 0.4 | 0.4 |
| D-Panthenol | | | 0.2 | 0.2 |
| Ajidew NL 50 | | | 1.0 | 1.0 |
| Dehyquart A CA | 3.0 | 3.0 | | |
| Lactic acid | 0.5 | 0.5 | | |
| Phenoxyethanol | 0.4 | 0.4 | 0.3 | 0.3 |
| Wacker-Belsil ADM 8020 VP | 0.9 | 0.9 | | |
| Litchiderm LS 9704 | 0.1 | 0.3 | 0.1 | 0.2 |
| Ectoin | 0.1 | 0.3 | 0.3 | 0.3 |
| Taurine | 0.1 | 0.3 | 0.5 | 0.3 |
| Extrapone White Tea GW | 0.1 | 0.3 | 0.1 | 0.2 |
| Water | Ad 100 | Ad 100 | Ad 100 | Ad 100 |

5.5 Hair Mask

|  | K-1 | K-2 | K-3 | K-4 |
|---|---|---|---|---|
| Synthalen K | 0.3 | 0.3 | 0.3 | 0.3 |
| Sepigel 305 | 3.0 | 3.0 | 3.0 | 3.0 |
| Dow Corning 1403 fluid | 0.5 | 0.5 | 0.5 | 0.5 |
| Sodium hydroxide solution 50% | 0.15 | 0.15 | 0.15 | 0.15 |
| Luviskol K 30 (powder) | 0.15 | 0.15 | 0.15 | 0.15 |
| Polymer JR 400 | 0.4 | 0.4 | 0.4 | 0.4 |
| Gafquat 755 N | 0.5 | 0.5 | 0.5 | 0.5 |
| Dehyquart F 75 | 0.6 | 0.6 | 0.6 | 0.6 |
| Quaternium-27 | 0.5 | 0.75 | 1.0 | 2.0 |
| Quaternium-91 | 1.0 | 1.5 | 2.0 | 4.0 |
| PPG-3 Benzyl Ether Myristate | 0.3 | 0.3 | 0.5 | 1.0 |
| Cationic benzoxazine (co)polymer alk-3 | 0.3 | 0.5 | — | — |
| Cationic benzoxazine (co)polymer alk-8 | — | — | 0.4 | — |
| Cationic benzoxazine (co)polymer alk-11 | 0.3 | — | — | 0.7 |
| Cashew oil | 0.1 | 0.1 | 0.1 | 0.1 |
| Akypoquat 131 | 1.0 | 2.0 | 2.5 | 4.0 |
| Tegoamid S18 | 0.5 | 1.0 | 1.0 | 1.5 |
| Rewoquat RTM 50 | — | — | 1.0 | 0.5 |
| Quaternium-80 | 0.5 | — | 0.5 | 1.0 |
| Dow Corning 200, 60000 cSt | 1.0 | 0.5 | 1.5 | 0.3 |
| Dow Corning 200 fluid, 0.65 cSt | 0.5 | 0.5 | 0.3 | 0.1 |
| Ethanol 96% | 17.0 | 17.0 | 17.0 | 17.0 |
| D-Panthenol 75% | 0.2 | 0.2 | 0.2 | 0.2 |
| Nicotinamide | 0.1 | 0.1 | 0.1 | 0.1 |
| Ajidew NL 50 | 1.0 | 1.0 | 1.0 | 1.0 |
| Litchiderm LS 9704 | 0.1 | 0.2 | 0.3 | 0.5 |
| Ectoin | 0.1 | 0.2 | 0.3 | 0.5 |
| Taurine | 0.1 | 0.2 | 0.3 | 0.5 |
| Extrapone White Tea GW | 0.1 | 0.2 | 0.3 | 0.5 |
| Water | Ad 100 | Ad 100 | Ad 100 | Ad 100 |

5.6 Hair Gel

|  | G-1 | G-2 | G-3 | G-4 |
|---|---|---|---|---|
| Synthalen K | 0.7 | — | 0.7 | 0.7 |
| Aculyn 28 | — | 0.6 | — | — |
| PVP/VA copolymer 60/40 | 10.0 | 5.5 | 10.0 | 10.0 |
| Amphomer | — | 2.0 | — | — |

-continued

| | G-1 | G-2 | G-3 | G-4 |
|---|---|---|---|---|
| Dow Corning 193 fluid | 0.5 | 0.5 | 0.5 | 0.5 |
| Akypoquat 131 | 0.4 | 0.4 | 0.8 | 2.0 |
| Quaternium-91 | 1.0 | 1.5 | 2.0 | 4.0 |
| PPG-3 Benzyl Ether Myristate | 1.0 | 1.0 | 1.0 | 1.5 |
| Dehyquart L 80 | 1.0 | 1.0 | 1.0 | 1.0 |
| Quaternium-72 | 0.5 | 0.5 | 0.5 | 1.0 |
| Quaternium-80 | 0.2 | 0.2 | 0.5 | 1.0 |
| Cetiol CC | 0.2 | 0.3 | 0.3 | 0.4 |
| Dow Corning 200, 60000 cSt | 1.0 | 0.5 | 1.5 | 0.3 |
| Cationic benzoxazine (co)polymer alk-3 | 0.5 | — | — | — |
| Cationic benzoxazine (co)polymer alk-8 | — | 0.4 | 0.3 | — |
| Cationic benzoxazine (co)polymer alk-11 | — | — | 0.3 | 0.6 |
| Avocado oil | 0.1 | 0.1 | 0.1 | 0.1 |
| Dow Corning 200 fluid, 0.65 cSt | 0.5 | 0.5 | 0.3 | 0.1 |
| Ethanol 96% | 25.0 | 25.0 | 25.0 | 25.0 |
| PEG-40 Hydrogenated Castor Oil | 0.6 | 0.6 | 0.6 | 0.6 |
| Litchiderm LS 9704 | 0.1 | 0.2 | 0.3 | 0.5 |
| Extrapone Stinging Nettle | 0.1 | 0.2 | 0.3 | 0.5 |
| Water | Ad 100 | Ad 100 | Ad 100 | Ad 100 |

5.7 Hair Spray

| | G-1 | G-2 | G-3 | G-4 |
|---|---|---|---|---|
| Ethanol 96% | 45.0 | 45.0 | 45.0 | 45.0 |
| AMP | 1.0 | 1.0 | 1.0 | 1.0 |
| Amphomer LV-71 | 3.0 | 3.0 | 3.0 | — |
| Hydagen HCMS | 0.3 | 0.5 | 0.8 | 0.3 |
| Polyquaternium-55 | — | — | — | 5.0 |
| Polyquaternium-11 | — | — | — | 3.2 |
| Cationic benzoxazine (co)polymer alk-3 | 0.5 | 0.3 | — | — |
| Cationic benzoxazine (co)polymer alk-8 | — | 0.4 | — | 0.5 |
| Cationic benzoxazine (co)polymer alk-11 | — | — | 0.6 | — |
| Quaternium-72 | 0.4 | 0.4 | 0.8 | 2.0 |
| Quaternium-91 | 1.0 | 1.5 | 2.0 | 4.0 |
| PPG-3 Benzyl Ether Myristate | 0.5 | 1.0 | 1.0 | 1.0 |
| Incromine BB | 0.3 | 0.5 | 0.8 | 1.5 |
| Dow Corning 200, 60000 cSt | 1.0 | 0.5 | 1.5 | 0.3 |
| Cetiol CC | 0.1 | 0.1 | 0.2 | 0.2 |
| Avocado oil | 0.1 | 0.1 | 0.1 | 0.1 |
| Dow Corning 200 fluid, 0.65 cSt | 0.5 | 0.5 | 0.3 | 0.1 |
| Dimethyl ether | 40.0 | 40.0 | 40.0 | 40.0 |
| Litchiderm LS 9704 | 0.1 | 0.2 | 0.3 | 0.5 |
| Ectoin | 0.1 | 0.2 | 0.3 | 0.5 |
| Taurine | 0.1 | 0.2 | 0.3 | 0.5 |
| Extrapone White Tea GW | 0.1 | 0.2 | 0.3 | 0.5 |
| Water | Ad 100 | Ad 100 | Ad 100 | Ad 100 |

To produce aerosol hair sprays, the agents were individually packaged in a suitable pressure-resistant container, which was then closed with valve. The agents were then combined with the propellant dimethyl ether.

5.8 Hair Mousse

| Raw materials | E1 | E2 | E3 |
|---|---|---|---|
| Sodium benzoate | 0.33 | 0.33 | 0.33 |
| Genamin CTAC[1] | 1.10 | 1.10 | 1.10 |
| PEG-40 Hydrogenated Castor Oil[2] | 0.88 | 0.88 | 0.88 |
| Perfume | 0.11 | 0.11 | 0.11 |
| AMP-Ultra PC 1000[3] | 0.51 | 0.39 | 0.26 |
| Cationic benzoxazine (co)polymer alk-3 | 0.45 | — | — |
| Cationic benzoxazine (co)polymer alk-8 | — | 0.65 | — |
| Cationic benzoxazine (co)polymer alk-11 | — | — | 0.45 |
| Allianz LT-120[4] | 7.10 | 5.30 | — |
| Luviquat Supreme[5] | 8.30 | 12.50 | 9.0 |
| Polyquaternium-4 | — | — | 1.0 |
| Sodium benzoate | 0.3 | 0.3 | 0.3 |
| Benzophenone-4 | — | — | 0.1 |
| Panthenol | 0.1 | 0.2 | 0.15 |
| Water, deionized | Ad 100 | Ad 100 | Ad 100 |

[1]Trimethylhexadecylammonium chloride (approx. 28-30% active substance in water; INCI name: Cetrimonium Chloride) (Clariant).
[2]Hydrogenated castor oil with approx. 40-45 EO units (INCI name: PEG-40 Hydrogenated Castor Oil) (BASF).
[3]2-Amino-2-methylpropanol (INCI name: Aminomethyl Propanol) (Dow Chemical).
[4]Copolymer of succinic acid $C_1$-$C_2$ alkyl ester, hydroxyalkyl acrylate and at least one monomer from acrylic acid, methacrylic acid and the simple esters thereof (approx. 46-47.5% solids content in water; INCI name: Acrylates/C1-2 Succinates/Hydroxyacrylates Copolymer) (ISP).
[5]Vinylpyrrolidone-methacrylamide-vinylimidazole-vinylimidazolium methosulfate copolymer (55:29:10:6) (19-21% solids content in water; INCI name: Polyquaternium-68) (BASF).

To produce aerosol hair mousses, the agents were individually packaged in a suitable pressure-resistant container, which was then closed with valve. The agents were then combined with a propellant mixture of propane and n-butane in a 1:1 molar ratio. The weight ratio of agent to propellant mixture was 92:8.

5.9 Hair Mask, Rinse-Off

| | |
|---|---|
| $C_{16-18}$ fatty alcohol | 7.00 |
| Eumulgin ® B2[1] | 0.03 |
| Akypoquat 131 | 1.20 |
| Laureth-4 | 0.075 |
| Laureth-6 | 0.075 |
| $C_{12-14}$ Sec-pareth-9 | 0.075 |
| PEG-8 | 0.075 |
| Quaternium-91 | 1.00 |
| PPG-3 Benzyl Ether Myristate | 0.5 |
| Quaternium-83 | 0.5 |
| Tegoamid S 18 | 1.00 |
| Dehyquart F 75[2] | 1.20 |
| Amodimethicone | 0.60 |
| Polyquaternium-37 | 0.5 |
| Dow Corning 200, 60000 cSt | 0.5 |
| Amaranth oil | 0.1 |
| Glycol | 0.15 |
| Cetiol CC | 0.3 |
| Cationic benzoxazine (co)polymer alk-3 | 0.6 |
| Panthenol | 0.5 |
| Tocopheryl acetate | 0.1 |
| Methylparaben | 0.20 |
| Perfume | 0.30 |
| Phenoxyethanol | 0.40 |
| Water | Ad 100 |

[1]Cetylstearyl alcohol + 20 EO (INCI name: Ceteareth-20) (Cognis)
[2]Mixture of ester quat and fatty alcohol (INCI name Distearoylethyl Hydroxyethylmonium Methosulfate (and) Cetearyl Alcohol) (Cognis)

5.10 Hair Conditioner, Rinse-Off

| | |
|---|---|
| $C_{16-18}$ fatty alcohol | 5.00 |
| Eumulgin ® B2[1] | 0.03 |
| Quaternium-27 | 1.20 |
| Trideceth-10 | 0.19 |
| Trideceth-5 | 0.11 |
| Dow Corning 200, 60000 cSt | 0.5 |
| Amaranth oil | 0.1 |
| Dehyquart F 75[3] | 1.20 |
| Cetiol CC | 0.3 |
| Cationic benzoxazine (co)polymer alk-8 | 0.9 |
| Amodimethicone | 0.48 |
| Glycerol | 0.135 |
| Dehyquart A | 2.0 |

-continued

| | |
|---|---|
| PPG-3 Benzyl Ether Myristate | 0.5 |
| Quaternium-91[2] | 6.00 |
| Polyquaternium-10 | 0.5 |
| Incromine BB | 2.5 |
| Akypoquat 131 | 2.0 |
| Pantholactone | 0.5 |
| Methylparaben | 0.20 |
| Perfume | 0.30 |
| Phenoxyethanol | 0.40 |
| Water | Ad 100 |

[1]Cetylstearyl alcohol + 20 EO (INCI name: Ceteareth-20) (Cognis)
[2]Dimethyldistearylammonium chloride (INCI name: Distearyldimonium Chloride) (Clariant)
[3]Mixture of ester quat and fatty alcohol (INCI name: Distearoylethyl Hydroxyethylmonium Methosulfate (and) Cetearyl Alcohol) (Cognis)

5.11 Shampoo

| | |
|---|---|
| Citric acid | 0.5 |
| Sodium Laureth Sulfate | 13.0 |
| Disodium Cocoamphodiacetate | 6.0 |
| Salicylic acid | 0.2 |
| D-Panthenol (75%) | 0.2 |
| Sodium Benzoate | 0.5 |
| Euperlan PK 3000 AM | 2.6 |
| Cetiol HE | 1.5 |
| Hydrogenated Castor Oil | 0.5 |
| Cetiol OE | 0.2 |
| Cationic benzoxazine (co)polymer alk-3 | 0.4 |
| Argan oil | 0.8 |
| Shea butter | 0.1 |
| Ceteareth-25 | 0.5 |
| Sodium chloride | 0.5 |
| Water | Ad 100 |

5.12 Shower Gel, Highly Moisturizing and Conditioning:

| Component | wt. % |
|---|---|
| Na-Laureth Sulfate (70% active substance) | 12.5 |
| Cocamidopropyl betaine (45% active substance) | 10.0 |
| Cationic benzoxazine (co)polymer alk-11 | 0.7 |
| Polyquaternium-7 | 1.5 |
| Polyglyceryl-3 caprate | 1.0 |
| Champagne extract | 1.0 |
| Cetiol ® HE | 0.5 |
| NaCl | 0.4 |
| Acidulant, UV filter, preservative, water | Ad 100 |

We claim:

1. Cationic benzoxazine (co)polymer, wherein at least 5% of all the nitrogen atoms, relative to the total number of all the nitrogen atoms in the cationic benzoxazine (co)polymer, are present in the form of permanently quaternary nitrogen atoms,
wherein the cationic benzoxazine (co)polymer is produced by
providing at least one polymerizable benzoxazine compound;
producing a non-cationic benzoxazine (co)polymer by polymerizing the at least one polymerizable benzoxazine compound under suitable polymerization conditions,
wherein less than 1% of nitrogen atoms of the non-cationic benzoxazine (co)polymer, relative to the total number of nitrogen atoms in the non-cationic benzoxazine (co)polymer, are present in the form of permanently quaternary nitrogen atoms, and
reacting the non-cationic benzoxazine (co)polymer with at least one alkylating agent in an amount wherein at least 5% of all nitrogen atoms, relative to the total number of nitrogen atoms in the non-cationic benzoxazine (co)polymer, are converted into permanently quaternary nitrogen atoms.

2. Cationic benzoxazine (co)polymer according to claim 1, wherein the polymerizable benzoxazine compound chosen from compounds of general formula (I) and compounds of general formula (II),

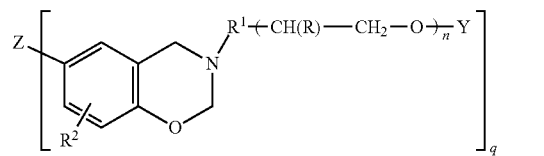

Formula (I)

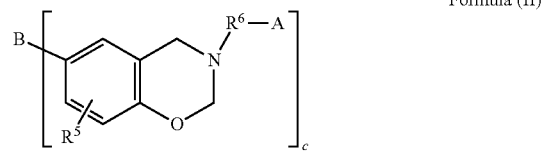

Formula (II)

wherein
q is an integer from 1 to 4;
n is a number from 2 to 20,000;
R in each repeat unit is mutually independently chosen from hydrogen or linear or branched, optionally substituted alkyl groups having 1 to 8 carbon atoms;
Z is chosen from hydrogen (where q=1), alkyl (where q=1), alkylene (where q=2 to 4), carbonyl (where q=2), oxygen (where q=2), sulfur (where q=2), sulfoxide (where q=2), sulfone (where q=2) and a direct, covalent bond (where q=2);
$R^1$ is a covalent bond or is a divalent linking group having 1 to 100 carbon atoms;
$R^2$ is chosen from hydrogen, halogen, alkyl and alkenyl or $R^2$ is a divalent residue which makes a corresponding naphthoxazine structure from the benzoxazine structure;
Y is chosen from linear or branched, optionally substituted alkyl groups having 1 to 15 carbon atoms, cycloaliphatic residues optionally containing one or more heteroatoms, aryl residues optionally containing one or more heteroatoms and *—(C=O)$R^3$,
wherein $R^3$ is chosen from linear or branched, optionally substituted alkyl groups with 1 to 15 carbon atoms and X—$R^4$, wherein X is chosen from S, O, and NH and $R^4$ is chosen from linear or branched, optionally substituted alkyl groups with 1 to 15 carbon atoms;
c is an integer from 1 to 4;
B is chosen from hydrogen (where c=1), alkyl (where c=1), alkylene (where c=2 to 4), carbonyl (where c=2), oxygen (where c=2), sulfur (where c=2), sulfoxide (where c=2), sulfone (where c=2) and a direct, covalent bond (where c=2);
A is a hydroxyl group or a nitrogenous heterocycle;
$R^5$ is chosen from hydrogen, halogen, alkyl and alkenyl or $R^5$ is a divalent residue which makes a corresponding naphthoxazine structure from the benzoxazine structure; and $R^6$ is a covalent bond or is a divalent linking group having 1 to 100 carbon atoms.

3. Cationic benzoxazine (co)polymer according to claim 2, wherein the polymerizable benzoxazine compound is chosen from compounds of general formula (III),

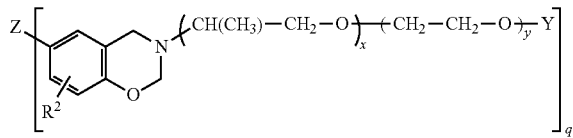

Formula (III)

wherein x is a number from 0 to 1000 and y is a number from 0 to 1000, with the proviso that $x+y \geq 2$, and $Z$, $R^2$, $Y$ and q are as defined in claim 2.

4. Cationic benzoxazine (co)polymer according to claim 2, wherein the polymerizable benzoxazine compound is chosen from compounds of general formula (IV) and compounds of general formula (V),

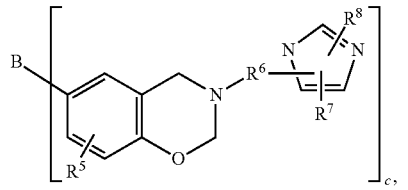

Formula (IV)

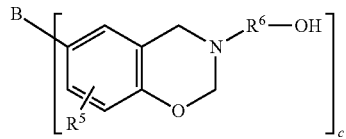

Formula (V)

wherein $R^7$ and $R^8$ are mutually independently chosen from hydrogen, halogen, linear or branched, optionally substituted alkyl groups, alkenyl groups and aryl groups; and c, B, $R^5$ and $R^6$ are as defined in claim 2.

5. Cationic benzoxazine (co)polymer according to claim 1, wherein the at least one alkylating agent is chosen from alkyl halides, dialkyl sulfates, dialkyl carbonates and alkylene oxides.

6. Cationic benzoxazine (co)polymer according to claim 1, wherein the cationic benzoxazine (co)polymer has a molecular weight of 500 to 100,000 g/mol.

7. Washing and cleaning agent or textile treatment agent comprising at least one cationic benzoxazine (co)polymer according to claim 1.

8. Cosmetic agent comprising in a cosmetically acceptable carrier at least one cationic benzoxazine (co)polymer according to claim 1.

9. Method for treating a surface comprising the steps of:
providing at least one cationic benzoxazine (co)polymer according to claim 1 in an applicable dosage form, and
treating at least one surface with the cationic benzoxazine (co)polymer provided.

10. Method for treating a surface according to claim 9, wherein the surface is chosen from carbon fibers, hard surfaces, textile surfaces and keratin fibers.

11. Method for producing a cationic benzoxazine (co)polymer having at least 5% of all nitrogen atoms, relative to the total number of nitrogen atoms in the cationic benzoxazine (co)polymer, present in the form of permanently quaternary nitrogen atoms, comprising the steps:
providing at least one polymerizable benzoxazine compound;
producing a non-cationic benzoxazine (co)polymer by polymerizing the at least one polymerizable benzoxazine compound under suitable polymerization conditions,
wherein less than 1% of nitrogen atoms of the non-cationic benzoxazine (co)polymer, relative to the total number of nitrogen atoms in the non-cationic benzoxazine (co)polymer, are present in the form of permanently quaternary nitrogen atoms, and
reacting the non-cationic benzoxazine (co)polymer with at least one alkylating agent in an amount wherein at least 5% of all nitrogen atoms, relative to the total number of nitrogen atoms in the non-cationic benzoxazine (co)polymer, are converted into permanently quaternary nitrogen atoms.

12. Coupling agent, sizing agent, hair conditioning agent and/or hair shaping agent comprising a cationic benzoxazine (co)polymer according to claim 1.

13. Method of coating surfaces comprising applying a composition containing a cationic benzoxazine (co)polymer according to claim 1 to a surface to be coated.

14. Method of coating surfaces according to claim 13 wherein the composition forms a coating when applied to the surface and the coating is an antibacterial coating.

15. Method of improving soil detachment from and/or reducing susceptibility to soil redeposition onto textiles or hard surfaces comprising applying an agent containing a cationic benzoxazine (co)polymer according to claim 1 onto the textile or hard surface.

* * * * *